(12) United States Patent
Rittmaster et al.

(10) Patent No.: US 9,924,216 B2
(45) Date of Patent: Mar. 20, 2018

(54) SYSTEM AND PROCESS FOR DISTRIBUTION OF INFORMATION ON A COMMUNICATION NETWORK

(76) Inventors: Ted R. Rittmaster, Westlake Village, CA (US); Greg A. Piccionelli, Westlake Village, CA (US)

( * ) Notice: Subject to any disclaimer, the term of this patent is extended or adjusted under 35 U.S.C. 154(b) by 2615 days.

(21) Appl. No.: 09/812,296

(22) Filed: Mar. 20, 2001

(65) Prior Publication Data

US 2002/0023010 A1 Feb. 21, 2002

Related U.S. Application Data

(60) Provisional application No. 60/191,003, filed on Mar. 21, 2000.

(51) Int. Cl.
*G06Q 30/02* (2012.01)
*H04N 21/414* (2011.01)
(Continued)

(52) U.S. Cl.
CPC ... *H04N 21/41415* (2013.01); *G06F 17/3087* (2013.01); *G06Q 30/02* (2013.01);
(Continued)

(58) Field of Classification Search
CPC ........................ G06Q 30/0261; G06Q 30/0251
(Continued)

(56) References Cited

U.S. PATENT DOCUMENTS 4,860,352 A  8/1989 Laurance et al.
5,243,652 A * 9/1993 Teare et al. .................. 380/250
(Continued)

FOREIGN PATENT DOCUMENTS

EP  0 778 513 A  6/1997
JP  07328830  6/1997
(Continued)

OTHER PUBLICATIONS

Supplementary European Search Report for EP 99 91 4289 (citing some of the references cited herein for related European patent application).

(Continued)

*Primary Examiner* — Sam Refai

(57) ABSTRACT

A communications system includes a plurality of recipient processors located at geographically remote locations with respect to each other and connected for communication with an information provider processor, over the communications network. The provider and recipient processors may comprise respective computers coupled for communication on the Internet or WWW. The provider processor is capable of providing information form any suitable source, by communicating such information over a communications network. However, access to the information by the recipient processors is controlled, based on the geographic location or region of the recipient processors. Each recipient processor is operably associated with a positioning system for providing geographic location information corresponding to the location or region in which the positioning system is located, such as a global positioning system GPS. The geographic position information is used to determine whether or not the processor requesting the information is within a restricted (or limited) or non-restricted region. This determination may be made comparing the geographic information provided by the recipient processor and positioning system with a list of non-restricted or non-limited (or a list of restricted or limited) geographic locations or regions.

11 Claims, 8 Drawing Sheets

(51) Int. Cl.

| | | |
|---|---|---|
| *G06F 17/30* | (2006.01) | |
| *G06Q 30/06* | (2012.01) | |
| *H04N 7/16* | (2011.01) | |
| *H04N 21/258* | (2011.01) | |
| *H04N 21/2668* | (2011.01) | |
| *H04N 21/472* | (2011.01) | |
| *H04N 21/81* | (2011.01) | |

(52) U.S. Cl.
CPC ..... *G06Q 30/0261* (2013.01); *G06Q 30/0601* (2013.01); *H04N 7/165* (2013.01); *H04N 21/25841* (2013.01); *H04N 21/2668* (2013.01); *H04N 21/472* (2013.01); *H04N 21/812* (2013.01); *A63F 2300/401* (2013.01); *A63F 2300/532* (2013.01); *A63F 2300/5573* (2013.01)

(58) Field of Classification Search
USPC ............... 705/14, 14.1–14.73; 795/14.57
See application file for complete search history.

(56) References Cited

U.S. PATENT DOCUMENTS

| | | | |
|---|---|---|---|
| 5,442,805 A | 8/1995 | Sagers et al. | |
| 5,519,403 A | 5/1996 | Bickley et al. | |
| 5,528,248 A | 6/1996 | Steiner et al. | |
| 5,555,376 A | 9/1996 | Theimer et al. | |
| 5,563,607 A | 10/1996 | Loomis et al. | |
| 5,568,153 A | 10/1996 | Beliveau | |
| 5,594,947 A | 1/1997 | Grube et al. | |
| 5,612,741 A * | 3/1997 | Loban et al. | 348/383 |
| 5,621,793 A | 4/1997 | Bednarek et al. | |
| 5,635,940 A | 6/1997 | Hickman et al. | |
| 5,659,617 A * | 8/1997 | Fischer | 380/258 |
| 5,669,061 A | 9/1997 | Schipper | |
| 5,678,194 A | 10/1997 | Grube et al. | |
| 5,682,525 A | 10/1997 | Bouve | |
| 5,754,657 A * | 5/1998 | Schipper et al. | 380/258 |
| 5,757,916 A | 5/1998 | MacDoran et al. | |
| 5,778,304 A * | 7/1998 | Grube et al. | 455/456.4 |
| RE35,916 E | 10/1998 | Dennison et al. | |
| 5,835,061 A | 10/1998 | Stewart | |
| 5,831,545 A | 11/1998 | Murray et al. | |
| 5,842,023 A | 11/1998 | Tsumura | |
| 5,852,775 A | 12/1998 | Hidary | |
| 5,857,155 A | 1/1999 | Hill et al. | |
| 5,898,830 A | 4/1999 | Wesinger et al. | |
| 5,910,799 A | 6/1999 | Carpenter et al. | |
| 5,926,116 A | 7/1999 | Kitanao et al. | |
| 5,928,306 A | 7/1999 | France et al. | |
| 5,938,721 A | 8/1999 | Dussell et al. | |
| 5,943,424 A | 8/1999 | Berger et al. | |
| 5,946,687 A | 8/1999 | Gehani et al. | |
| 5,959,577 A | 9/1999 | Fan et al. | |
| 5,969,678 A | 10/1999 | Stewart | |
| 5,987,381 A | 11/1999 | Oshizawa | |
| 6,009,116 A * | 12/1999 | Bednarek et al. | 375/130 |
| 6,055,478 A | 4/2000 | Heron | |
| 6,067,582 A | 5/2000 | Smith | |
| 6,085,098 A | 7/2000 | Moon et al. | |
| 6,115,754 A | 9/2000 | Landgren | |
| 6,133,853 A | 10/2000 | Obradovich | |
| 6,134,454 A * | 10/2000 | Foladare et al. | 455/556.2 |
| 6,138,142 A | 10/2000 | Linsk | |
| 6,154,172 A | 11/2000 | Piccionelli | |
| 6,208,866 B1 | 3/2001 | Rouhollahzadeh et al. | |
| 6,236,330 B1 * | 5/2001 | Cohen | 340/691.6 |
| 6,262,721 B1 | 7/2001 | Tsukidate et al. | |
| 6,282,362 B1 | 8/2001 | Murphy et al. | |
| 6,317,718 B1 * | 11/2001 | Fano | 705/1 |
| 6,321,334 B1 * | 11/2001 | Jerger et al. | 726/1 |
| 6,370,629 B1 * | 4/2002 | Hastings et al. | 711/163 |
| 6,381,695 B2 * | 4/2002 | Kudo et al. | 713/156 |
| 6,389,288 B1 | 5/2002 | Kuwahara et al. | |
| 6,397,040 B1 | 5/2002 | Titmuss et al. | |
| 6,449,721 B1 * | 9/2002 | Pensak et al. | 713/171 |
| 6,484,148 B1 * | 11/2002 | Boyd | 705/14 |
| 6,674,860 B1 * | 1/2004 | Pirila | 380/247 |
| 6,731,612 B1 | 5/2004 | Koss | |
| 6,816,595 B1 * | 11/2004 | Kudo | 380/277 |
| RE38,899 E * | 11/2005 | Fischer | 380/258 |
| 6,985,588 B1 * | 1/2006 | Glick et al. | 380/258 |
| 7,124,190 B1 * | 10/2006 | Moore | 709/229 |
| 2002/0017977 A1 * | 2/2002 | Wall | 340/5.28 |

FOREIGN PATENT DOCUMENTS

| | | |
|---|---|---|
| JP | 08338034 | 9/1997 |
| JP | 08127557 | 12/1997 |
| JP | 08135589 | 12/1997 |
| WO | WO96/07110 | 3/1996 |
| WO | WO 97 13341 A | 4/1997 |
| WO | WO98/47295 | 10/1998 |

OTHER PUBLICATIONS

Situated Information Spaces and Spatially Aware Palmtop Computers by George W. Fitxmaurice (Communications of the ACM, vol. 36, No. 7, pp. 39-49, Jul. 1993).

A Distributed Software Architecture for GPS-Driven Mobile Applications by Thomas G. Dennehy (1995 Mobile and Location-Independent Computing Symposium, pp. 99-108).

A Genetic Map Interface to Query Geographic Information Using the World Wide Web by David Crossley and Tony Boston (World Wide Web Journal, Fourth International World Wide Web Conference, pp. 723-735 (Dec. 11-14, 1995).

Mobisaic: An Information System for a Mobile Wireless Computing Environment by Geoffrey M. Voelker and Brian N. Bershad (Mobile Computing, pp. 375-395 (1996)).

Genesis and Advanced Traveler Information Systems by Shashi Shekhar and Duen-Ren Liu (Mobile Computing, pp. 699-723 (1996)).

Providing Location Information in a Ubiquitous Computing Environment by Mike Spreitzer and Marvin Theimer (Mobile Computing, pp. 397-423 (1996)).

Location-Based Authentication Grounding Cyberspace for Better Security by Dorothy E. Doming and Peter F. MacDoran (Computer Fraud & Security, pp. 12-16 (Feb. 1996)).

Maps alive: viewing geospatial information on the WWW by Michael Potmesil (Computer Networks and ISDN Systems, vol. 29, Nos. 8-13 (1997) pp. 1327-1342.

Mobile Information Service Based on Multi-Agent Architecture by Nobutsugu Fujino, Takashi Kimoto and Ichiro Ida (IEICE Trans. Commun., vol. E80-B, No. 10, Oct. 1997).

Chris Peat, "Welcome to Heavens above" Website, Nov. 28, 1999 and Sam Wormley Online Query regarding same, Jan. 3, 2000.

* cited by examiner

SYSTEM AND PROCESS FOR DISTRIBUTION OF INFORMATION ON A COMMUNICATION NETWORK

RELATED APPLICATIONS

The present invention relates to U.S. Provisional Application 60/191,003, filed Mar. 21, 2000, which is incorporated herein by reference and from which priority is claimed. The present invention also relates to U.S. Pat. No. 6,154,172, issued Nov. 28, 2000 and PCT Application No. PCT/US99/06943, filed Mar. 30, 1999, each of which is incorporated herein by reference.

FIELD OF THE INVENTION

The present invention relates, generally, to a system, process and article of manufacture for distribution of information on a communications network and, in preferred embodiments, to such a system, process and article for distribution of information on the Internet or World Wide Web, based on the geographic location of the internet or web user requesting the information and/or the geographic location of the information provider.

BACKGROUND OF THE INVENTION

The Internet and World Wide Web (WWW) have opened vast new global marketplaces and opportunities for companies, organizations, institutions and individuals to distribute and obtain information and to interact verbally and visually with others, virtually on a world-wide basis. By employing the Internet and WWW, companies and groups of all sizes and individuals may have, in effect, a world-wide market in which to distribute information, products and services using the Internet or WWW (including, but not limited to, programs, movies, photographs, and other information that can be transmitted over the Internet or WWW).

However, such a geographically expansive marketplace can be problematic for contexts in which the information, products or services are intended for a particular geographic area or location. Typical web site operators have no control over or knowledge of the geographic area or location of a user accessing the web site and, thus, no control over the area or location at which its web site content may be read, viewed or otherwise downloaded. Similarly, typical Internet or web users have no control over or knowledge of the geographic area or location of the web site's operator server from which the web site content is read, viewed or otherwise downloaded.

Consider, for example, a company or individual involved in the business of selling a product or service, but which is constrained under statute or contract to a limited geographic sales region. In one representative example, a software company contracts with various software distribution companies to sell its software in specified sales regions, wherein each distributor is provided a sales region and, under the terms of the contract, is not allowed to sell the software outside of the region. A distribution company may desire to employ the Internet or WWW as a distribution channel, but would need to limit sales (and access to the distributed software) to only those Internet users (customers) that are located within the region assigned to that company.

As another example, consider a company or individual in the business of providing a lottery or other game in which a fee is required to play and the player is provided with a chance to win money or prizes. Under many legal jurisdictions (which can also be defined in terms of geographic areas), such lotteries and games may be illegal or otherwise limited by gambling statutes, rules or regulations. Again, the company or individual may desire to offer the lottery or game service over the Internet or WWW, but also avoid potential legal liability for offering such services to Internet users that are located in a geographic region of an adverse legal jurisdiction.

As yet another example, consider a company, organization or individual involved in distributing information having a content that is politically or ethically sensitive in certain geographic regions, but not other geographic regions. Again, the company, organization or individual may desire to provide the information over the Internet but, for political, ethical or legal reasons, may also desire to limit the accessibility to the information to certain geographic regions.

Thus, in a number of contexts, there is a need in the industry for a system by which a provider of a service or product on the Internet may readily limit access to the product or service, based on the geographic region in which the user requesting the product or service is located.

SUMMARY OF THE DISCLOSURE

Embodiments of the present invention relate to a system, process and article of manufacture for limiting the distribution of information on a communications network based on geographic location. In preferred embodiments, the invention relates to such a system, process and article fort limiting distribution of information on the Internet and World Wide Web (WWW), based on the geographic location of the Internet user requesting the information.

A system according to a general embodiment of the present invention includes at least one information provider processor which is coupled to a plurality of recipient processors on a communications network. The recipient processors are located at geographically remote locations with respect to each other and connected for intercommunication with the provider processor, over the communications network. In preferred embodiments, the provider and recipient processors comprise respective computers coupled for communication on the Internet.

The provider processor is capable of providing information from any suitable source, by communicating such information over a communications network. However, access to the information by the recipient processors is controlled, based on the geographic location or region of the recipient processors.

Each recipient processor operates with an associated a means for providing a position signal. Various embodiments of the invention may employ any suitable means which provides a computer readable signal that corresponds to the position, or geographic location, of the recipient processors, including, but not limited to, devices for generating pre-recorded geographic information and user-operated input devices. However, in preferred embodiments, the geographic location information is generated by a means which calculates the location from information received at the location from satellite signals, such as a global positioning system GPS.

The geographic position information is used to determine whether or not the processor requesting the information is within a restricted (or limited) or non-restricted region. This determination may be made by any suitable procedure, including, but not limited to, comparing the geographic information provided by the recipient processor and positioning system with a list of non-restricted or non-limited (or restricted) geographic locations or regions. Thus, according to some embodiments, information may be provided or not provided (access to the information may be allowed or denied) dependent on the geographic information provided by the recipient processor, such that, if a recipient processor provides geographic information corresponding to a restricted geographic location or region, then the provider processor will be controlled to not provide selective information to the recipient processor. On the other hand, if a recipient processor provides geographic information corresponding to a non-restricted geographic location or region, then the provider processor is controlled to provide the selective information to the recipient computer.

In further embodiments, a set of rules may be implemented, depending upon the geographic information (and, thus, the geographic location or region) such that various restrictions or limitations may be implemented for various geographic locations or regions. Thus, if a recipient processor provides geographic information corresponding to a first geographic location or region, then the provider processor may be controlled to not provide selective information to the recipient processor, unless further criteria is met. For example, such further criteria may include, but is not limited to, a minimum user age, a particular period of the day, week, month or year, or other suitable criteria. Other geographic locations or regions may be associated with similar or other limitations or restrictions to the access of information from the provider processor.

In this manner, the distribution of information on a communications network may be controlled, based on geographic location of the recipient of the information.

BRIEF DESCRIPTION OF THE DRAWINGS

A brief description of preferred embodiments of the invention will be made with reference to the accompanying drawings, wherein.

DETAILED DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of the invention. The scope of the invention is best defined by the appended claims.

As summarized above, the present invention relates, generally, to a system, process and article of manufacture for limiting the distribution of information on a communications network based on geographic location and, in preferred embodiments, to such a system, process and article for limiting distribution of information on the Internet or WWW, based on the geographic location of the Internet user requesting the information.

Figure 1:
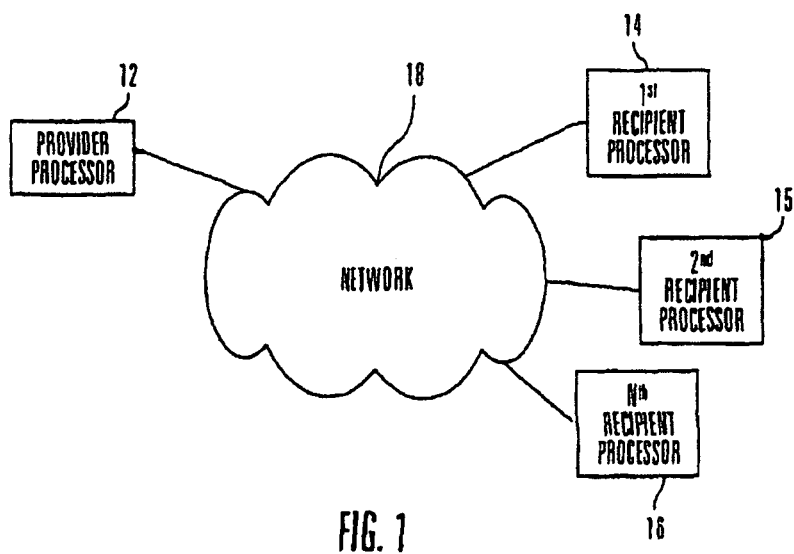
FIG. 1 is a generalized schematic view of a wide area network system, which may be used to implement embodiments of the present invention.

FIG. 1 represents a general embodiment and can also represent a specific Internet embodiment of the present invention, as described below. With reference to FIG. 1, a system 10 is shown according to a general embodiment of the present invention, wherein an information providing processor (provider processor 12) is coupled for communication to a plurality of recipient processors 14-16 located at mutually different geographic locations with respect to each other, by a communications network 18. The processors may comprise any suitable data processing and communicating device controlled, preferably by a software program, to operate as described below. The communications network may comprise any suitable means which allows the recipient processors and the provider processor to communicate with each other, including, but not limited to, the Internet or WWW, intranet, cable or other hard-wired networks, optical, electromagnetic or other wireless networks, as well as hybrids thereof, or the like.

The provider processor 12 is capable of providing information from any suitable source (including, but not limited to an on-line source or a computer readable storage medium such as a hard or floppy disk, random access memory RAM, read only memory ROM, compact disk (CD), other optical storage disk, such as a DVD, or the like), by communicating such information over a communications network 18. In addition, or alternatively, the provider processor 12 may provide information by directing a recipient to a further site on the network 18, for example, by providing the recipient with a site locator, such as a uniform resource locator (URL) for a network site at which the provided information is available. Such information may include, but is not limited to, data, text or image information including software programs, for example, having different market, legal, political, social, ethical or moral implications in different geographic regions. In preferred embodiments of the present invention, access to the information by the recipient processors 14-16 is controlled, based on the geographic location or region of the recipient processors, the provider processor or both.

Distribution Based on Location of Recipient

In accordance with one aspect of the invention, information is accessed or distributed based on the geographic location of the recipient processor (recipient-location based system). In such embodiments, the recipient processors comprise on-line user terminals, including, but not limited to conventional personal computers (PCs), portable communication devices (such as portable telephones, personal digital assistants, or other portable information units), or vehicle-mounted computers connected to a wide area network, such as, but not limited to, the Internet. However, in further embodiments, the recipient processor may comprise other types of processing or computing systems, such as dedicated processor system, set top boxes, mainframe systems or workstations.

Figure 2:
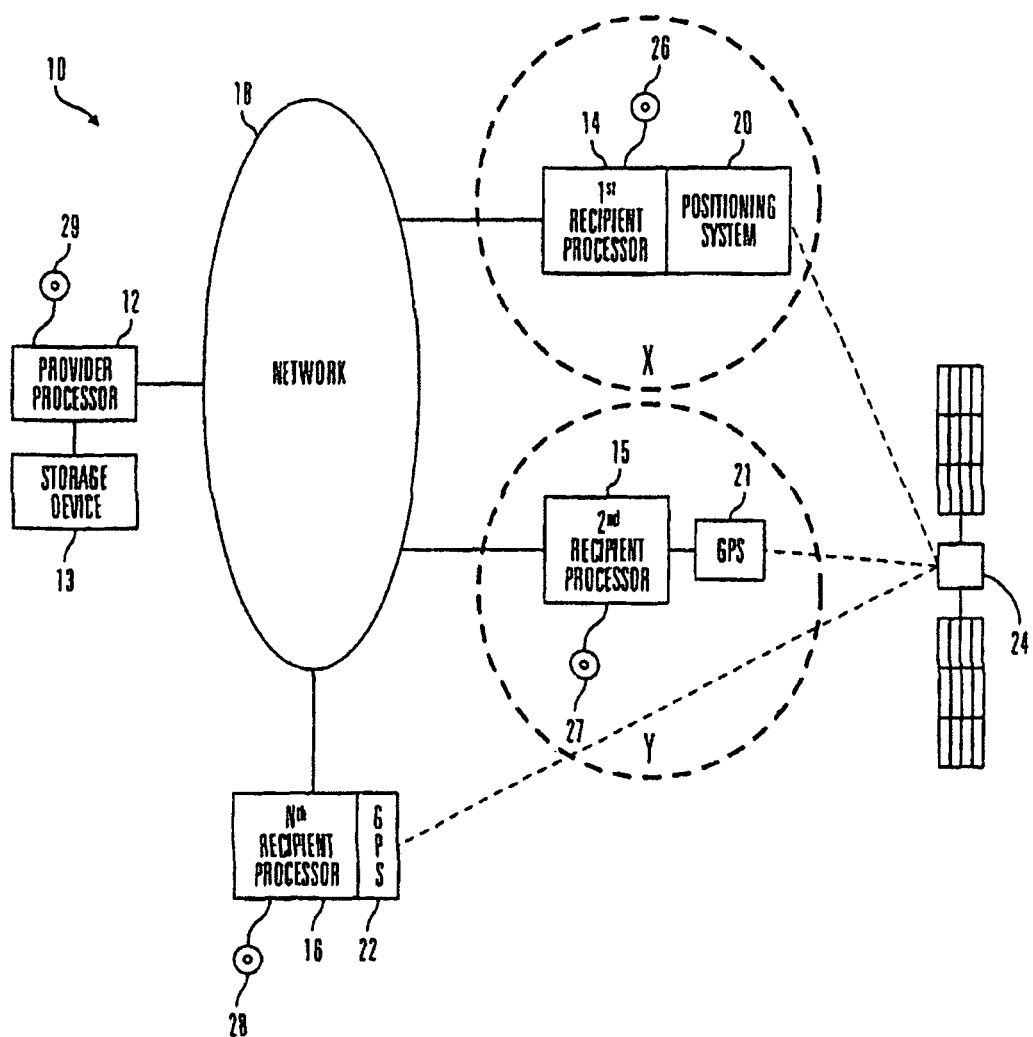
FIG. 2 is a generalized schematic view of a system according to an embodiment of the present invention.

An example recipient-location based system is shown in FIG. 2. In the FIG. 2 example, each recipient processor 14-16 operates with an associated means 20-22 for providing a position signal. Various embodiments of the invention may employ any suitable means which provides a computer readable signal corresponding to the position, or geographic location or region, of the recipient processors, including, but not limited to, devices for generating pre-recorded geographic information, or user-operated input devices operated by a user to input information corresponding to a geographic location or region (for example, a keyboard, touch-screen, microphone, display icons that are selected by positioning a mouse curser and clicking the mouse, or the like). However, in preferred embodiments, the geographic location information is generated by a means which calculates the location from information received at the location from satellite signals, such as a global positioning system GPS.

For example, GPS circuitry may be included as part of the circuitry of the recipient processor system or included in a circuit card that may be installed in a recipient processor system. Alternatively, GPS circuitry may be included in a module connectable to the recipient processor system from a location external to the housing containing the recipient processor.

In a preferred embodiment, the GPS is implemented with circuitry contained in a portable device that can be easily connected and disconnected by a user to a recipient processor or to a reading device associated with recipient processor. For example, the GPS circuitry may be contained in a plug-in connector such as a dongle, an electronically readable card, an electronically readable token or the like. In such embodiments, the recipient processor includes a suitable receptacle, such as a serial or parallel port for connecting to a plug-in module or a card or token reader for receiving electronic information from a card or token. In another example, the GPS circuitry is contained in a portion of a disc or similar structure shaped to be inserted in a standard disc reading device, such as a floppy disc drive, compact disc drive, optical disc drive, magneto-optical disc drive or the like, wherein other portions of the disc structure define computer readable media containing programs and/or data for controlling the recipient processor to carry out functions described herein.

Geographic location information obtained from the GPS, or from other means for providing a position signal, is used to determine whether or not the processor requesting the information is within a restricted (or limited) or non-restricted region. This determination may be made by any suitable procedure, including, but not limited to, comparing the geographic information provided by the recipient processor and positioning system with a list of non-restricted or non-limited (or restricted) geographic locations or regions. Thus, according to some embodiments, information may be provided or not provided (that is, access to the information may be allowed or denied) dependent on the geographic information provided by the recipient processor, such that, if a recipient processor provides geographic information corresponding to a restricted geographic location or region, then the provider processor will be controlled to not provide selective information to the recipient processor. On the other hand, if a recipient processor provides geographic information corresponding to a non-restricted geographic location or region, then the provider processor is controlled to provide the selective information to the recipient computer.

In further embodiments, a set of rules may be implemented, which depend upon the geographic information (and, thus, the geographic location or region of the recipient processor), such that various restrictions or limitations may be implemented for various geographic locations or regions. Thus, if a recipient processor provides geographic information corresponding to a first geographic location or region, then the provider processor may be controlled to not provide selective information to the recipient processor, unless further requirements are met. Other geographic locations or regions may be associated with similar or other requirements, limitations or restrictions to the access of information from the provider processor.

While embodiments of the invention may be applicable in a variety of network contexts, in which a network of processors in mutually different geographic locations are coupled through a communications network to a provider processor, preferred embodiments relate to Internet or WWW contexts, in which a provider computer and a plurality of user computers are coupled for communication, through the Internet.

For example, FIG. 1 may be considered a generalized representation of an Internet or WWW embodiment. wherein the provider server 12 comprises an Internet product or service provider computer or server (hereinafter referred to as the provider server) coupled for communication. through the Internet 18, to a plurality of network-enabled user devices (such as those described above as recipient processors). The plurality of user devices includes a first user device 14 at a location within a first geographic region X and a second user device 15 at a location within a second geographic region Y, remote from the first region X. Any suitable number of user devices at mutually different geographic locations and/or regions may be connected through the Internet 18, as represented by the Nth user device 22. The user devices may be coupled in communication with the provider server 12 simultaneously or during mutually different periods of time. As described above, the user devices 14-16 and provider device (or server) 12 may each comprise any suitable computer or processor device having means for interfacing with and communicating on a communications network and for operating, preferably under the control of software programs, in the manner described below. Such computers and communication interfacing are well known in the art and are not described in further detail herein for purposes of simplifying the present disclosure.

In the FIG. 2 embodiment, each user device 14-16 is operatively coupled to an associated means 20-22 for providing a position signal to its associated user computer, indicative of the location or region in which the means is located. As discussed above, in some embodiments, such means may include a user input device associated with a given user device 14-16 (including, but not limited to a keyboard, touch-screen, microphone, display icons that are selected by positioning a mouse cursor and clicking the mouse, or the like) which is operated by the user to input information associated with the user's location or region. For example, such information might include, but is not limited to, the user's zip code, street address, city, state, country, or the like. Alternatively, the means for providing position information may comprise a machine-readable storage media (including, but not limited to, a hard disk, floppy disk, optical or magneto-optical disk, or the like) on which position information is pre-stored and selectively retrieved by or provided to its associated user device. Thus, for example, software associated with the user device or the provider device may operate to provide a prompt to the user to enter position information through the user input device or provide a command to the user's device to retrieve such information from its pre-stored location as needed.

However, in preferred embodiments, the means 20-22 associated with each user device 14-16, for providing position information to its associated user device, comprises a means which is capable of generating position information from signals and/or information obtained by the means in its location environment, including, but not limited to satellite signals received in its location environment. In preferred embodiments, each position information providing means comprises a satellite-signal positioning system, for example, a Global Positioning System GPS 20-22. More specifically, each positioning system 20-22 includes a receiver which receives satellite signals from one or more satellites 24 in orbit about the Earth and processes information derived from those signals to produce further information regarding the geographic location of the positioning system.

Therefore, the positioning system 20 produces information regarding its geographic location. Similarly, the positioning system 22 produces information regarding its geographic location, which is different than that of positioning system 20. In accordance with modern GPS technology, such geographic information may, for example, correspond to a pre-established global coordinate system such as, but not limited to, Latitude and Longitude (Lat/Long), Universal Transverse Mercator (UTM), Ordinance Survey of Great Britain (OSGB), Universal Polar Stereographic (UPS), Thomas Brother's Page and Grid™, Trimble Atlas™, or the like.

In preferred embodiments, the positioning systems 20-22 are coupled in close proximity to their respective associated user device 14-16 (or at least to a video monitor coupled to the associated computer), such that each positioning system and its respective associated user device (or computer monitor) are located in the same geographic region. Thus, in FIG. 2, the positioning system 20 is at a location within the same geographic region X as a user device 14. Similarly, the positioning system 21 is at a location within the same geographic region Y as a user device 15.

In preferred embodiments, the positioning systems are internal positioning systems, in that they are incorporated within the same housing that also contains their respective associated computer, as shown with respect to positioning system 20 and user device 14. In other preferred embodiments, the positioning systems are located in a housing external to the associated user's computer (or device) housing, but still within the proximity of the associated computer (or device) housing (or display monitor), as shown with respect to positioning system 21 and user device 15. Thus, a user device 15 located within an enclosed area, such as inside of a building or structure through which satellite signals may be difficult to receive, may be coupled to a satellite positioning system device (GPS device) 21 located in an external housing. In this manner, the external housing may be located in a convenient location suitably near the associated user device, but also suitable for receiving satellite signal transmissions, for example, near or outside of a window of the office in which the user's computer (or other user device) is located, or on the roof of the building in which the user's computer (or other user device) is located, or other signal-receiving locations within a suitable vicinity of the associated computer (or other user device). The external positioning system device 21 may be coupled to its associated user device 15 by any suitable coupling means, including, but not limited to wire, optical, radio frequency RF, electromagnetic or other suitable communication link.

Further, preferred embodiments may employ one or more computers with internal positioning systems and one or more computers with external positioning systems, as shown in FIG. 2. Because of the close proximity of each positioning system to its associated user device (or display monitor), a given positioning system will produce location information that corresponds to the geographic location of its associated user device (and user), or at least to a geographic location within the same geographic region as its associated user device (and user).

As described above, the location information produced by each positioning system 20-22 is provided to the user device 14-16 respectively associated with the positioning system that produced the information. Interface hardware and software for coupling positioning systems, such as GPSs, with computers are well known in the art. Moreover, some portable computers are presently being manufactured with internal GPS hardware and software for processing geographic position information relating to the geographic position of the portable computer. Accordingly, technology associated with interfacing a positioning system and a computer for communicating information there between and processing, by the computer, of geographic location information is well known in the art and, for purposes of simplifying the present disclosure, is not described in detail herein.

In one aspect of the FIG. 2 embodiment, the user devices 14-16 are operated under the control of associated user software 26-28, respectively to communicate geographic information to the provider device, such as a provider server 12. The server is operated under the control of associated server software 29 to selectively provide or deny a given user device 14-16 access to a product or service dependent upon the geographic information provided by the given user device. In other configurations of the FIG. 2 embodiment, the user devices 14-16 are controlled by the user software 26-28 to selectively provide or deny access, without the need to communicate geographic information to the provider.

Figure 3:
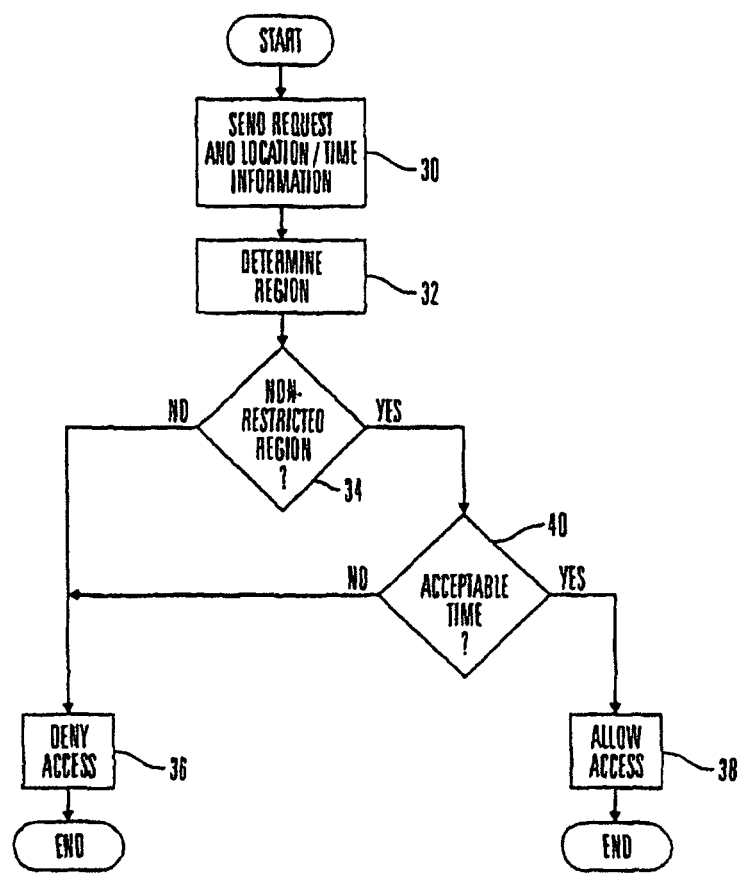
FIG. 3 is a flow chart representing a process carried out by the system of FIG. 1, according to an embodiment of the present invention.

One embodiment of an operational process is generally shown with respect to the flow chart of FIG. 3. At step 30 in FIG. 3, a user of, for example, the first user device 14, sends a request over the Internet 18 to the server 12, requesting one or more products or services that can be provided over the Internet connection. The request may be in the form of: for example, a request to access an Internet web site, a request to access a link from a web site page, a selection of an item on a menu displayed on a web page, or other forms of requests for content over a network. Example embodiments of such a request are described in further detail below, with respect to FIGS. 4a and 4b.

In addition, geographic information corresponding to the geographic location and/or region X of the positioning system 20 (and, thus, of the first user device 14) is provided to the first device 14 by the positioning system 20 associated therewith. Such geographic information may include, for example, data corresponding to coordinate values provided by the positioning system, such as GPS generated position values. Alternatively, such geographic information may include data corresponding to the region X, for example, determined by a routine of software 26, from information provided by the positioning system 20. Thus, for example, a software routine may control the user device 14 to determine a region X for example, the region of a particular zip code, city, state, country or other geographically defined region) in which the user device 14 is located from the location information provided by the positioning system 20 and to provide identification data corresponding to that region (such as an identification name or code preassigned for region X).

In preferred embodiments, however, the geographic information is communicated from the first user device to the server 12 and the determination of the region in which the user device is located is performed at the provider server, under control of a routine of software 29 (as represented by step 32 in FIG. 3). Once the user device's region (region X) is determined, a routine of software 29 controls the provider server 29 to determine whether or not the region X is a restricted region (step 34). This determination may be made by any suitable routine, including, but not limited to, a comparison of the data (e.g., ID data) for region X with a pre-stored (or on-line) table or list of restricted regions (or a list of non-restricted regions).

Alternatively, the determination of whether or not the user device is in a restricted region may be made (at the user device 14 or, more preferably, at the provider server 12) from data corresponding to the location information (such as coordinate values) provided by the positioning system 20, without determining the pre-assigned ID name or code for the region X. For example, coordinate values (as opposed to the ID name or code) may be applied in an algorithm or comparison routine to determine whether or not the coordinates are within a restricted region. Thus, in one example embodiment, a routine may determine, by a pre-stored (or on-line) mathematical comparison routine or algorithm, whether or not the coordinate value data is within a particular range corresponding to the range of coordinates of a restricted (or non-restricted) geographic region.

The path marked "No" from the step 34 in FIG. 3 represents a determination that the region X in which the user device 14 is located is a restricted region. If the region X is determined to be a restricted region, then the provider server 12 is controlled to deny access by the user device 14 to the requested product or service (step 36). In preferred embodiments, the server 12 provides a deny message to the user device 14 as part of step 36.

On the other hand, if the region X is determined in step 34 to be within a non-restricted region, then the user device 14 may be provided access to the product or service (step 38). fu preferred embodiments, if access is allowed (in step 38), the server 12 downloads to the user device 14, software files, programs, data, decode keys, or other information that defines the requested product or service or that are necessary for the user to obtain the requested product or service.

Accordingly, in the system embodiments of FIGS. 2 and 3, a user device may communicate a request for a product or service, as well as geographic information identifying the location or region of the user device, to a provider of the product or service on a wide area network, such as the futemet or WWW. The provider employs the geographic information to determine whether to allow or deny access to the product or service requested by the user device. In this manner, the provider of a requested product or service on the network may control access to the product or service on the basis of the geographic location of the user making the request. In other embodiments, the software for determining whether the user should be denied or provided access to the requested product or service resides on the user device (or is connected to or read by the user device), such that geographic information need not be communicated over the network from the user's device to the provider device.

In further preferred embodiments, instead of a simple access/deny-access determination, the provider may provide limited access for one or more geographic regions or may provide various degrees of limited access, depending upon the geographic region of the user device. Thus, for example, a set of rules may be implemented such that the server 12 in FIG. 2 may be controlled to allow full access to a particular product or service for user devices (such as 14) in a first region (region X), partial access to the product or service for user devices (such as 15) in a second region (region Y) and no access for user devices (such as 16) located outside of regions X and Y. A set of rules may be pre-stored (for example, as part of the program controlling the determination step 34 or as part of another program or file operable with the control program), for implementing various combinations and degrees of limitations, depending upon the geographic location of the requesting user device. Alternatively, a set of rules may be provided to the server 12 from an on-line source, or the like.

In some embodiments, according to such rules, the provider may require additional user input or other information to provide limited or full access, depending upon the geographic location of the user device. For example, with respect to the above embodiment, the provider server 12 may be controlled to allow access to any user device in the second region (region Y), only if the user also provides further information, such as the user's age, identification information, payment information, acceptance of an agreement, or other information, or only after the user is provided with a warning, disclaimer or other message or information. Preferably, the provider server 12 is controlled by the software 29 to communicate a request for such further information and/or to communicate the warning, disclaimer or other message or data to the user.

Other information, which is not necessarily received from the user computer, may be employed in the determination of whether or not to allow access (full or limited). For example, restrictions or limitations may be imposed on certain regions during certain times of the day or during certain dates, wherein time or date information is provided to the server 12 from any suitable source.

In preferred embodiments in which the determination of whether to provide, deny or limit access to the requested product or service is carried out by the provider server 12, the user device (14-18) communicates time information to the server, for example, as part of or following the request for the product or service. In a preferred Internet example embodiment, the communication of time information is controlled by software residing on the user device, transparent to the user, such that the user need only select a product or service by, for example, clicking on an appropriate location in a web site (or otherwise entering data corresponding to a request), and the user's device will generate and communicate location and time information as part of or in association with the user's request.

The server 12 may then be controlled to make a determination (step 36 in FIG. 3) of whether or not the time information received from the requesting user device (14-16) is within an expected range, for example, within a preselected time period before the time that the server 12 receives the request (and/or the location information), which can be represented as:

$$(t_1 - \Delta t) \leq t_2 \leq t_1$$

Where Δt, is the preselected time period, $t_1$ is the time at which the request (and/or location information) was received by the server, and $t_2$ is the time corresponding to the time information received from the requesting user device. Other suitable algorithms or like means may be used to determine whether or not $t_2$ is acceptable for a given user computer request. A step 40 for testing the acceptability of the time $t_2$, can improve the reliability that the location information was not pre-generated and recorded at another region. Thus, time testing step 40 can provide a greater confidence to the provider that the location information in a given request was generated by a positioning system at the same location (or at least within the same local region) as the requesting user device and at about the same time that the requesting user device is making the request.

In the FIG. 3 embodiment, the determination of whether or not the time information received from the requesting user device corresponds to an acceptable time (step 40) is carried out following the determination that the requesting user device is within a non-restricted region or, at least, a limited access region (step 34). However, in other embodiments, the acceptable time determination step (step 40) may be carried out before the region restriction determination step (step 34), such that the request is tested for an acceptable time prior to being tested for an acceptable geographic region. In such an embodiment, if the time $t_2$ is determined to be not acceptable, then access would be denied (step 36). The process would not proceed to the region-restriction determination step (step 34) unless the time $t_2$ is determined to be acceptable in the time determination step.

Time information (corresponding to time t2) which is communicated to the server 12 by the requesting user device (14-16) is preferably derived or generated from information obtained from the satellite (or other) signals received by the positioning system (20-22) associated with the requesting device. Typical modem GPS receivers receive and process time information signals as part of the satellite-signal processing steps carried out to determine geographic location. Because this time information will generally corresponds to the time at which the satellite signals are received and processed by the requesting user device, this time information may be used to provide the time information communicated to the server 12 by the requesting user device (14-16). Alternatively, as described above, the time information may be obtained from other sources, including but not limited to a clock (not shown) located external or internal to the positioning system (20-22) and/or user device (14-16).

In further preferred embodiments, for purposes of minimizing counterfeit position or time information, the requesting computer (or more preferably, the positioning system) may be controlled to encrypt the time data and the geographic location data before transmission to the server 12. In yet further preferred embodiments, the location and time information provided by the positioning system (20-22) are encrypted together to render it more difficult to determine either one or both items of information without the decryption algorithm or key. In yet further preferred embodiments, the location and time information may be encrypted by the requesting user device (or more preferably, the associated positioning system) according to a key encoding scheme, wherein a common encoding key K1 is used at the user side and a decoding key K2, different from the encoding key K1 issued to the user devices, is used by the server 12 for decoding the user device's communications and obtaining the location and time information therefrom.

Figure 4A:
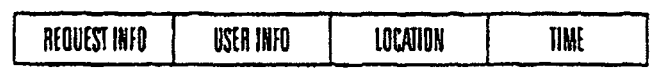
FIG. 4a is a block diagram representing a communication packet provided by a user computer of the system shown in FIG. 1, according to an embodiment of the present invention.
Figure 4B:
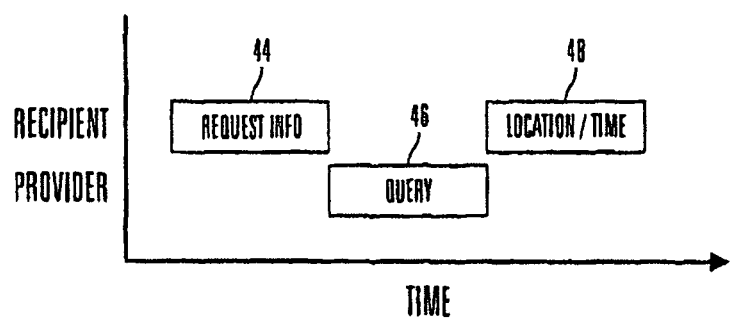
FIG. 4b is a block diagram representing communication packets provided by a user computer and the provider computer of the system shown in FIG. 1, according to a further embodiment of the present invention.

In this manner, a requesting user device communicates location information having (and preferably encrypted with), in effect, a time stamp corresponding generally to the time at which the satellite signals were received and the location information was generated. In one embodiment, the location and time information may be communicated from the requesting user device as part of the request (as represented in FIG. 4*a*) or as part of a separate communication (as represented in FIG. 4*b*). More specifically, FIGS. 4*a* and 4*b* represent examples of alternative schemes for carrying out step 30 of FIG. 3. In FIG. 4*a*, a request packet 42 communicated by the requesting user device to the server 12 includes location and time information, as well as information identifying the product or service requested ("request info") and, optionally, information identifying the user ("user info"). Preferably, at least the location and time information is encrypted. However, in further preferred embodiments, all of the information may be encrypted together to render it more difficult to decode without the decryption key or algorithm.

In more preferred embodiments, the location and time information are communicated separate from the requested product information ("request info"), as shown in FIG. 4*b*. In FIG. 4*b*, the requesting user device first communicates a request for a product or service, as represented by request packet 44. The server 12 may then be controlled to determine whether or not the requested product or service is one which involves geographic restrictions or limitations. If not, the server may be operated to take further steps to provide access to the requested product or service. However, if the requested product or service is one which does involve geographic restrictions or limitations, then the server may be controlled to communicate a query 46 to the requesting user device, in response to which the requesting user device may then communicate location and time information (represented by packet 48).

In further preferred embodiments, the user device 14-16 is controlled by software 26-28 to periodically (or otherwise successively) communicate location and/or time information generated by the associated positioning system 20-22 during a communication interchange between the provider server 12 and the user device. As a result, the provider server is provided with multiple location and/or time information packets over the course of a communication interchange, to continue to monitor the user device's location (or region) and reported time, thus, to allow the provider server a greater confidence that the user device is located at the location or region that corresponds to the location information during the time of the communication interchange. While, in the above embodiments, the user devices may be controlled to automatically communicate the periodic (or successive) location and/or time information, in a further embodiment, the server computer 12 may be controlled by software 29 to periodically (or otherwise successively) communicate queries or prompts to the user devices 14-16 during a communications interchange, requesting that the user communicate location and/or time information. The user device may then be controlled by its associated software to respond to each query by communication location and/or time information to the provider server. In yet further embodiments, the user device may be controlled by software or hardware resident in or with the user device to render the determination of whether or not to continue to provide access of the content to the user, thus, without requiring the location and time information to be communicated over the network.

In one example embodiment, the user device may be controlled to provide location and/or time information periodically or successively while the requested content is being communicated to the user device in, what appears to the user as, a continuous stream. Thus, in periodic or successive intervals during the reception of a stream of content, the user device may be controlled to provide location and/or time information. If, at any time during the stream of content, the location and/or time information provided by the user device does not correspond to an expected location or time, as described above, then user access to the stream of content may be thereafter denied or cut-off. The denial of access may be controlled by the server, for example, by stopping the streaming of content. Alternatively, the denial of access may be controlled by the user device, for example, by inhibiting processing or reception of the streamed content or by exiting the web site associated with the content server. In the above embodiments, the stream of content may comprise, for example, a lengthy content file, such as a digital movie file, music file, graphics file, electronic book, computer game, or the like.

Figure 5:
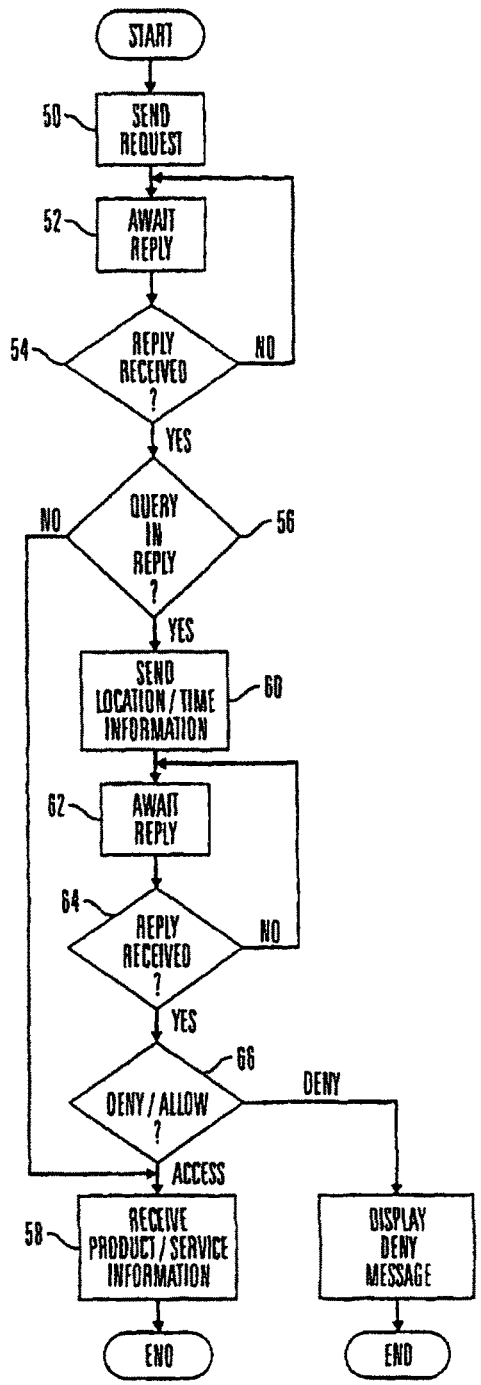
FIG. 5 is a flow chart representing an example embodiment of a process carried out by a user computer of the system shown in FIG. 1.
Figure 6:
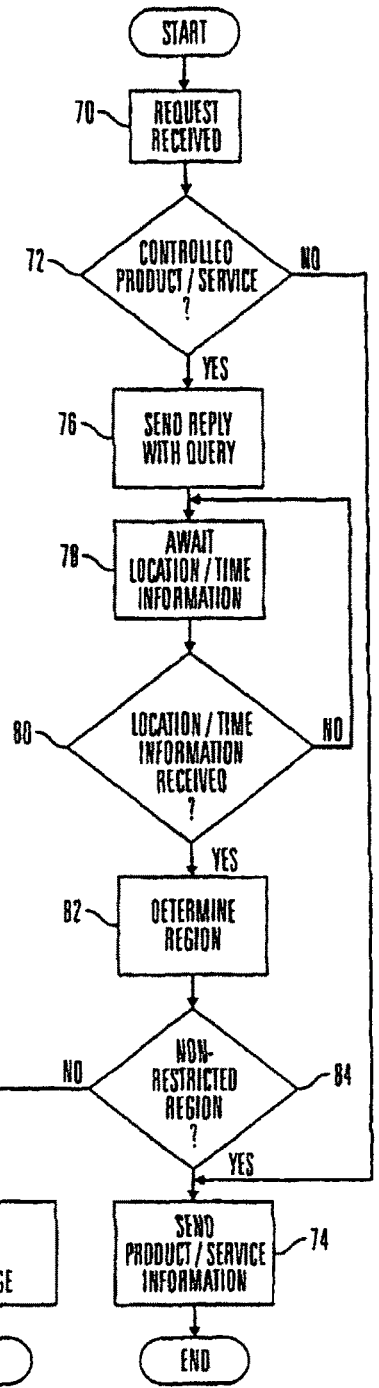
FIG. 6 is a flow chart representing an example embodiment of a process carried out by the provider computer of the system shown in FIG. 1.

The flow charts of FIGS. 5 and 6 show example processes carried out by the requesting user device (14-16) and the server 12, respectively, under the control of the software (26-28) and 29, respectively. The flow chart of FIG. 5 represents an example embodiment of a process carried out by the requesting user device, in accordance with the scheme of FIG. 4b.

Initially, the requesting user device communicates a request (step 50) and then awaits a reply (steps 52 and 54). Preferably, if a reply is not received within a predetermined time from the request step 50, a determination is made (in step 54) to terminate the process as a failed attempt. If a reply is received within the allotted time, then a determination is made as to whether or not the reply is a query for location information and/or time information (step 56). If not, the requesting user device prepares for receiving the requested product or service (step 58). However, if the reply is a query for location and/or time information, then the requesting user device is controlled to communicate location and/or time information (step 60) and awaits a reply (steps 62 and 64). Such location and/or time information may be encrypted prior to communication, as part of step 60.

Preferably, if a reply is not received within a predetermined time from the send step 60, a determination is made (in step 64) to terminate the process as a failed attempt. If a reply is received within the allotted time, then a determination is made as to whether or not the reply is a denial message (step 66) and, if so, the user device may be controlled to display a "denied access" message to the user and the procedure may be terminated. If, on the other hand, the reply is an acceptance message or the requested product or service, then the requesting user device prepares for receiving the requested product or service (step 58).

The flow chart in FIG. 6 represents an example embodiment of a process carried out by the server 12, upon receiving a request for a product or service. In the FIG. 6 embodiment, the server receives a request from a user device (step 70). The server 12 is then controlled to determine whether or not the requested product or service is one which is limited or restricted geographically (step 72). This may be accomplished, for example, by comparing identification information for the requested product or service with a pre-stored (or on-line) table or list of products or services which have geographic limitations or restrictions (or which are free of such limitations or restrictions).

If the requested product or service is not limited or restricted by the geographic location of the requester, then from step 72, the process proceeds to prepare for sending the requested product or service (step 74). If, on the other hand, the requested product or service is one which is geographically limited or restricted, then the server 12 is controlled to send one or more queries, requesting location and/or time information. (step 76) and then await receipt of such information (steps 78 and 80). Preferably, if a reply is not received within a predetermined time from the send step 76, a determination is made (in step 80) to terminate the process as a failed attempt. If a reply is received within the allotted time, then, at least in some embodiments, the region in which the user device resides is determined (step 82) and the thus-determined region is compared with a table or list of non-restricted (or restricted or limited) regions (step 84) to determine whether the requesting user device is within a restricted, limited or non-restricted access region. Alternative embodiments may determine this information from the location information, instead of first determining the region to which the location information corresponds. If the location and/or time information was encrypted prior to communication from the user device, then step 82 would also involve a step of decoding the encoded information prior to determining the geographic region associated with the information.

If the server determines that the requesting user device is within a non-restricted region, then the server prepares to send the requested product or service (step 74). Otherwise, the server sends a deny message to the requesting user device and terminates the process (step 86).

While, the processes represented in FIGS. 5 and 6 are example embodiments for carrying out various aspects of the present invention, other processes which involve the communication over the Internet (or other communications network) of location information obtained from positioning system (such as a GPS) and which control, limit or restrict access to products or services based on such location information, may be within the scope of further embodiments of the present invention.

Furthermore, it is noted that determinations, such as whether or not the requested product or service is controlled (step 72), whether or not the user device is in a restricted region (step 82 and/or 84) or the degree of restriction or additional information needed based on the user's geographic location (step 74) are primarily described above as being performed by the server 12. This may be preferred for purposes of minimizing fraudulent requests. However, such systems and processes require the communication of the recipient (or user) device's location over the network, which may be problematic if the user's location is considered to be sensitive or private information.

Other embodiments avoid the need to communicate location information over the network, for example, by employing the recipient (or user) device 14-16 and software (26-28) to perform some or all of these determinations. The recipient (or user) device may also be controlled by its associated software perform the time comparison functions (step 80). Thus, for example, the user device (or information receiver processor) may operate with software that effectively locks the user device (information receiver) out or otherwise disables or limits the user device's ability to receive requested information, products or services, or disables or limits the ability to process received information, products or services into a user perceptible or usable form, in the event that the user device (information receiver) is in a geographic region for which access to such information, products or services is restricted or limited, or is not in a location that corresponds to a predefined (unrestricted) or expected geographic region.

In one example embodiment, a server that receives a request for a product or service from a recipient (user) device may be programmed to send a prompt to the recipient device to effect the geographic control functions. For example, upon receiving a request for a product or service from a recipient device (step 70 in FIG. 6), the server processor first determines whether the requested product or service is controlled (step 72 in FIG. 6). If not, then the recipient device is provided access to the product or service. However, if the requested product or service is controlled, then the server computer communicates a prompt or command to the recipient device to perform the remaining steps of the process. The server processor may also provide the recipient device with data corresponding to one or more geographic location, which may be, for example restricted, limited access or free access locations. Alternatively, the prompt or command and/or the data corresponding to one or more geographic location may be included as part of the content of the product or service being requested.

The recipient device may, thus, be controlled by suitable software, firmware or the like residing on the recipient device (or otherwise accessible by the device) to, for example, selectively deny, limit or allow access to predefined information on the network, display warning or other messages, or enable or disable processing or receiving circuitry or routines necessary to receive or effectively use the predefined information on the network, without requiring the transmission of location information from the recipient device.

In another example embodiment, a server that receives a request for a product or service from a recipient device may be programmed to send the content (product or service) in an encrypted format, wherein the decryption key or algorithm includes or uses the location information corresponding to, for example, a free access region, or the expected location of the recipient device. Many forms of encryption are commonly used for electronic transmissions of content, including Internet communications. Typical encryption schemes employ an algorithm and/or a key for decrypting the encrypted content. Such algorithms and keys typically include or are composed of values, numbers, parameters, or the like.

In accordance with one embodiment of the present invention, data corresponding to the geographic location of the recipient (user) processor is used as, for example, one or more of the values, numbers or parameter of the decryption key and/or algorithm. Time data, as described above, may also be used in the decryption key and/or algorithm. Yet other data, such as identification information, including user identification and/or user device identification information, may be used in conjunction with the location data or with the location and time data to provide values, numbers or parameters of the decryption key or algorithm. Thus, a recipient (user) processor that is provided access to (receives) encrypted content over the network (for example, Internet), will query its associated positioning system for geographic location information (and, in some embodiments, time information and identification information) and will use such information as the decryption key (or as part of the decryption key) or in the algorithm required for decrypting the content. In yet other embodiments, the location information (in some embodiments, location information in conjunction with time information and/or identification information) may be used as part of an address or may be used to derive an address from a look-up table, address algorithm or the like, where the address corresponds to a memory location, network location or the like, at which the recipient processor may obtain a decryption key pre-stored or generated at the address location.

Figure 7:
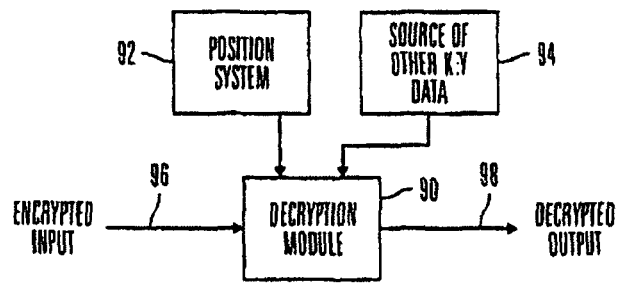
FIG. 7 is a generalized block diagram of a decryption module system.

FIG. 7 is a generalized block diagram of a decryption module system in accordance with one embodiment of the present invention. A respective decryption module system may be coupled to, implemented by or part of each respective recipient processor 14-16 in FIG. 2. In the FIG. 7 diagram, the module system includes a decryption module 90 that comprises a hardware, firmware, software or hybrid decryption system for performing decryption operations in accordance with any suitable decryption technique. Various encryption/decryption techniques applicable to the present invention are well known in the art, including, but not limited to public key algorithm (RSA), private key, hybrid, or other suitable techniques.

The decryption module 90 is coupled to obtain geographic location information from a source of location information 92 (for example, one of the positioning systems 20-22 in FIG. 2), such as a GPS. Time information may also be provided by the source 92 or other suitable source, as described above. The decryption module 90 may also be coupled to obtain additional data for use in a decryption key or algorithm. Such additional data may be obtained from any suitable source 94, including, but not limited to a user input device, a card reading device, a memory device containing pre-stored data, an on-line connection, a processor routine which derives codes, serial numbers or other data from components resident on the user's device, or the like. In one embodiment, such additional data comprises an identification code issued or assigned to the user, where the identification code is preferably unique with respect to identification codes issued to other users. Such codes may be issued or otherwise assigned to authorized users (or subscribers) by, for example, the content provider at some time before content communication transactions are carried out by the users.

The decryption module system, comprising the module 90, source 92 and, in some embodiments, source 94 may be implemented in hardware, software, firmware or combinations thereof for operation with its associated recipient processor. The module 90 and one or both sources 92 and 94 may be implemented as separate units connected together or, more preferably, as a single unit within a common housing or package that may be readily connectable to its associated recipient processor. In one preferred embodiment, a housing or package containing the module 90 and one or both sources 92 and 94 also includes a connector for connecting to a standard serial, parallel, RSA or other port on the recipient processor, such that the module system may be easily connected to or disconnected from a suitable recipient processor by a user. For example, the module system may be housed or packaged in a dongle device as described above, a disc or other structure configured to fit within a standard disc drive as described above, or other suitable housing or packaging connectable to the recipient processor through standard or nonstandard ports on the recipient processor, using one or more wired or optical, electromagnetic, or other wireless connections.

In operation, the decryption module 90 receives encrypted content as input 96 from, for example, an Internet connection. In one embodiment, the module 90 is coupled directly to an Internet connection. In more preferred embodiments, the recipient processor has an Internet connection for receiving the encrypted content and passes the received encrypted content to the input 96 of the decryption module 90.

In addition, the decryption module 90 obtains geographic location information from system 92 and any other data that may be used in the decryption process. for example, time data from system 92 or other suitable time source, and/or identification data from source 94. The decryption module 90 employs the geographic location information, time information and/or identification information in the decryption process to produce a decrypted content signal as the module output 98.

Figure 8:
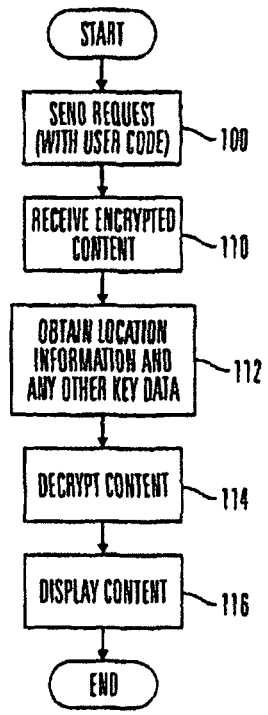
FIG. 8 is a flow chart representing another example embodiment of a process carried out by a user computer.
Figure 9:
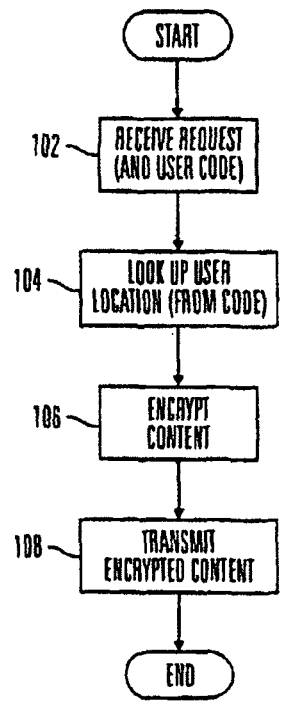
FIG. 9 is a flow chart representing another example embodiment of a process carried out by a provider computer.

FIGS. 8 and 9 are generalized flow chart diagrams of processes carried out by a content provider processor and a recipient (or user) processor in accordance with an example embodiment of the above-described decryption system. It will be understood, however, that other processes for performing the general encryption/decryption aspects described herein (using geographic information or combinations of geographic, time and identification or other information) may also be employed without departing from the present invention. FIG. 8 represents an example process carried out by a recipient processor, while FIG. 9 represents an example process carried out by the content provider processor, as part of the same content communication transaction.

In one embodiment of the process of FIGS. 8 and 9, each authorized user pre-registers with the content provider and is provided a user code (preferably unique to the user). The code may be an alphanumeric string, symbol, icon or the like which may later be entered or selected by the user with a user input device. Alternatively, the code may be recorded on a machine readable card, token or other device to be carried by the authorized user or recorded in a memory device (including, but not limited to hard, floppy, optical or magneto-optical disc, tape, firmware or dongle devices) associated with the user's communication device (computer, set top box, dedicated processor system, PDA, mobile telephone, or the like). In yet further embodiments, the code may be derived from an on-line connection, or by a processor routine which derives pre-recorded codes, serial numbers or other data from components (including, but not limited to, micro-processors, disc drives, operating systems, or the like) resident on or connected to the user's device.

As part of the registration process, the user's geographic location is obtained by the provider, and may be verified by any suitable process, including, but not limited to looking up the user in a telephone directory, requiring the user to submit verifying data and/or payment information such as credit card data, or the like. The provider may then form a table or other suitable mechanism for associating user codes with corresponding user geographic locations, such that the provider will be able to associate each authorized user with an expected (and, preferably, pre-verified) geographic location. For example, a look-up table scheme may be employed in which user codes are associated on a one-to-one basis with data corresponding to an expected user location or with an address or pointer to a memory location at which the expected user location is stored. The user code itself may form an address or a portion of an address at which data corresponding to an expected user location is stored. In further embodiments, more than one expected user location may be associated with a given user code, for example, corresponding to multiple locations in which the user is expected to receive content, such as the user's home(s), office(s), other places of business or commercial establishments, locations along an expected travel route, or the like. Thus, in one embodiment, a user may register multiple locations with a content provider. In such an embodiment, the lookup table entry or memory locations associated with a user code noted above may include data corresponding to the multiple geographic locations.

The content provider may charge fees to each user for registration of a user location and may charge additional fees for each additional or groups of additional registered locations for a given user. Fees charged to a given user may also be based on other factors, such as the number of people or recipient devices likely to be present at the registered location(s) or the number of users simultaneously receiving content at registered location(s), where greater fees are charged for greater numbers of people or users.

In a further embodiment, the user code is assigned to the user after the user provides geographic information for one or more locations and, preferably, after the content provider verifies the geographic information as noted above. In such an embodiment, the user code may be generated by the content provider to include an encrypted form of the user's registered geographic location(s). Thereafter, during a communication process, the user code may be decrypted (used in an algorithm or otherwise employed) to determine the user's expected location(s).

Once a user has registered with the content provider and has received or has been assigned a user code, the user may send a request for content, products or services, over the network, for example, the Internet, (100 in FIG. 8) and the provider processor may then receive the request over the network (102 in FIG. 9). In an Internet embodiment, the request may be initiated over the Internet by a user, for example, attempting to access a web page, attempting to access a link on a web page, submitting request or order information, or the like. The user request may include (or be accompanied by) a user code assigned to the user making the request, as described above. In other embodiments described below, the user need not have a pre-assigned user code and the recipient (user) processor requesting the content need not send a user code. The content provider may charge a fee to the user from which a request is received or for which a request is fulfilled. Moreover, the fee charged to a given user to obtain access to a given content or each piece of content may be dependant upon factors described above, relating to the number of registered locations for the user, the likely number of users or recipient processors at each registered location, the actual number of simultaneous users at the registered location(s), or the like. Thus, a higher fee may be charged to when the number of locations, users or recipient processors is greater, in the above example.

In embodiments in which a user code is employed, the recipient (user) processor may be programmed to provide the user code as part of or in association with each user's request for content. Alternatively, the recipient processor may be programmed to first determine whether the requested content requires control measures (similar to the determination described above with respect to step 72 in FIG. 6) and, if so, only then provide the user code as part of or in association with the request for the content.

In yet a further alternative, the recipient processor may communicate the request without the user code. In such an embodiment, the provider processor may be programmed to determine whether the requested content requires control measures (similar to the determination described above with respect to step 72 in FIG. 6). If the requested content does not require control measures, then the access to the content may be provided to the recipient (user) processor (again, similar to steps 72 and 74 in FIG. 6). However, if the requested content requires control measures, then the provider processor issues a query or command to the requesting recipient computer to provide the user code (similar to step 76 in FIG. 6, but querying for user code instead of geographic location). In response, the recipient computer communicates the user code to the provider processor.

Once the provider processor receives the user code, the provider processor associates an expected location with the user code (104 in FIG. 9). The expected location may be derived by the provider processor, for example, from the above-described table (for example, look-up table) or other suitable mechanism for associating user codes with corresponding expected user locations. The provider processor may then encrypt the content with an encryption algorithm or technique for which the expected user location is part of the decryption key or decryption processes used to decrypt the content, as described above (106 in FIG. 9). In further embodiments, the encryption algorithm or technique may also employ the user code (and user identification or recipient processor identification information) as part of the decryption key or decryption process.

The encrypted content is communicated to the recipient processor over the network (108 in FIG. 9) and received by the recipient processor (110 in FIG. 8). In other embodiments, the encrypted content may be communicated to the recipient processor through other means, including, but not limited to, mailing or otherwise delivering a computer readable medium on which the encrypted content is stored, broadcasting the encrypted content through satellite or ground based broadcast systems, or the like. The recipient processor also obtains location information and, in some embodiments, other decryption key or algorithm data, for example, as described above with respect to sources 92 and 94 in FIG. 7 (112 in FIG. 8). While step 112 is shown in FIG. 8 as following step 110, other embodiments may obtain (or at least begin the process of obtaining) location information and any other key or algorithm data before or while the encrypted content is received (110 in FIG. 8).

The recipient processor then attempts to decrypt the encrypted content, using the location information provided by the positioning system 92 and any other key or algorithm data provided by sources 92 and 94 as described above with respect to decryption module 90 in FIG. 7. If the location and other data corresponds to the same data expected by the provider processor (for example, the same data that was previously verified and included in the provider processor's look-up table and/or the appropriate time data as described above), then the decryption algorithm or key employed by the recipient processor should successfully decrypt the encrypted content (114 in FIG. 8) and the decrypted content may then be displayed to the user (116 in FIG. 8). On the other hand, if the location and/or other data obtained from sources 92 and 94 does not correspond to the expected data (indicating, for example, that the recipient processor is not located at the proper location or that time data indicates that the location information may have been pre-recorded), then the decryption algorithm or key used by the recipient processor should not successfully decrypt the encrypted content.

In embodiments in which time data is used as part of the encryption/decryption technique or scheme, the content may be encrypted in a manner in which the decryption key or algorithm would include or employ a time parameter which must fall within a specified range of time (for example) t) to successfully decrypt the encrypted content. The range )t may be a selected time period following the transmission of content from the content provider, within which the provider expects or desires the recipient to receive and/or process and display the content. Thus, if the time data from source 92 or 94 does not correspond to a time within )t, then the decryption attempt would not be successful.

Alternatively, the content provider may involve a dynamically changing encryption technique or scheme, for which the decryption algorithm or key changes over time. For example, the time data parameter associated with )t may change over time. In such an embodiment, the recipient processor may be programmed to perform a plurality of retrievals of time data from source 92 or 94 (periodically or otherwise successively) during the receipt and/or decryption of the content, to continue to successfully decrypt the encrypted content. In one embodiment, the receipt of encrypted content, decryption of encrypted content and successive retrievals of time data may occur substantially simultaneously. In further embodiments, a plurality of retrievals of geographic location information from position system 92 may be performed and used in the dynamically changing decryption algorithm or key, as an alternative or in addition to successive retrievals of time data as described above.

In one dynamic encryption embodiment, the content encryption technique, scheme, algorithm or key changes a plurality of times during the course of a communication of the requested content, such that the recipient processor must successively change the decryption technique, scheme, algorithm or key at intervals corresponding to the intervals at which the encryption technique, scheme, algorithm or key were changed. In such an embodiment, the recipient processor and content provider processor may be synchronized during an initiation or handshaking procedure, to change encryption and decryption techniques, schemes, algorithms or keys in a synchronized fashion. Alternatively, the recipient processor may synchronize or otherwise be controlled by data included in the content to change decryption techniques, schemes, algorithms or keys at the appropriate time. In higher security embodiments, the encryption and decryption techniques, schemes, algorithms or keys may be changed at seemingly random intervals.

In yet further embodiments, time data is used as part of the encryption/decryption technique or scheme as described above, however, without the use of geographic location information. In such embodiments, the content is encrypted in a manner for which the decryption algorithm or key includes or employs the expected time or range of time )t. The recipient processor obtains current time information from a suitable time source as described above and employs the current time information in an attempt to decrypt the content If the current time information corresponds to the expected time or range of time )t, then the recipient processor should be able to decrypt the encrypted content. If the current time information does not correspond to the expected time or range of time )t, then the recipient processor should not be able to decrypt the encrypted content.

In embodiments in which the recipient processor (or user device) communicates its location information to the provider processor, the provider processor may maintain a record of the number of recipient processors (user devices) requesting or accessing content at a given time from a location or locations registered for a given user. If the number exceeds a threshold (which could be set at one or more), then the provider processor may assume that one or more recipient processors (or user devices) are unauthorized users and may thereafter inhibit or cut-off all users from the registered location or locations. Thus, if the registered location is a household, the threshold may be set to the number of expected users within the household. If the registered location is a theater, stadium, concert hall or the like, then the threshold may be set to the number of ticket holders.

In other embodiments, a user code need not be issued or communicated. Instead, the provider need only know in advance the specific (or, in some embodiments, the general) expected location (or general region) of the authorized users and encrypt the content in a manner for which a decryption key or algorithm includes or uses the expected location (or any location within the expected general region) to decrypt the content, as described above. The expected location of authorized users may be determined, for example, during a registration process as described above or other suitable means. In this manner, the content provider may communicate (or allow access to) the encrypted content to any recipient processor from which a request for such content is received or with which a communication channel is otherwise opened. However, unless the recipient processor is located in an expected location (or region) and is, therefore, provided location information from its associated position system 92 for that location or region, the recipient processor will not be able to obtain the appropriate decryption key or algorithm to successfully decrypt the content. The encryption/decryption technique or scheme may also employ other data (such as time data or user code data) from sources 92 and 94, as described above. In addition, the encryption/decryption technique or scheme may dynamically change, as described above. Furthermore, the recipient processor may be controlled to perform multiple location and/or time retrievals and successful comparisons with expected location and/or time information during reception and/or decryption of the content to allow continued reception or decryption.

In other embodiments, such as for contexts in which lower content security is tolerable, instead of encrypting the content, the content may be provided with shell or wrapper software or a tag or command for controlling the recipient computer to carry out location-dependent access functions as described above. For example, in response to the receipt of a request from a recipient processor and, in preferred embodiments, a determination that the requested content is controlled (similar to steps 70 and 72 in FIG. 6), the provider processor communicates the requested content, with shell or wrapper software or with a tag or label as described below. In embodiments in which shell or wrapper software is included with the content, the recipient processor is controlled by the shell or wrapper software to perform functions as described above, for example, with respect to obtaining geographic location information for the associated positioning system (for example, GPS), determining whether or not the recipient processor is in a restricted, limited or non-restricted access region and/or applying access or limitation rules based on the location of the recipient processor. In embodiments in which a tag or indicator is included with the content, the tag or label operates to execute the above-described functions of the recipient processor, from software pre-stored on a memory device associated with the recipient processor. In such embodiments, the tag may comprise an execute command or any other form of indicator initiating the pre-stored software routines. In yet further embodiments, a shell, wrapper or tag may be employed in combination with full or partial encryption of the content to increase security.

In the above embodiments, the shell, wrapper, tag or label may include information corresponding to the expected geographic location of the recipient processor and/or the expected time or time range )t. The recipient processor may then use the expected location and/or time information to perform a comparison process with current location and/or time information obtained from sources 92 and 94 as described above.

According to yet other shell/wrapper and tag/label embodiments, in response to the receipt of a request from a recipient processor and, in preferred embodiments, a determination that the requested content is controlled (similar to steps 70 and 72 in FIG. 6), the provider processor communicates a query or request for the recipient computer's location and/or information (similar to step 76 in FIG. 6) and the recipient processor responds with such information (similar to step 60 in FIG. 5). The provider processor then employs the location information in shell or wrapper software or in a tag or label and associates the shell or wrapper, or the tag or label with the content. The content and associated shell/wrapper or tag/label is then communicated to the recipient processor.

In preferred embodiments, all (or, at least some) further communications from the provider processor to the recipient processor that may occur in the transaction include a shell/wrapper or tag/label. In the context of a typical Internet website experience, a user may receive multiple communications, corresponding to multiple pages of a website or multiple links taken by the user. Thus, each page or link may be considered a separate communication for which a shell, wrapper, tag or label may be employed as described above. Alternatively, each packet or each predefined number of packets communicated over the Internet may be considered a separate communication for which a shell, wrapper, tag or label may be employed as described above. In this manner, with the receipt of each communication (or, at least some of the further communications) from the provider processor, the recipient processor is controlled by the shell or wrapper software (or by pre-stored software initiated by the tag or label) to obtain location information from its associated locating system and compare the location information with that included in the shell/wrapper or tag/label. Further access to the content is controlled (for example, denied, limited or allowed) by the software, based on whether or not the location information from the locating system corresponds to location information included in the shell/wrapper or tag/label. For example, if the location information does not match, then access may be denied (for example, by inhibiting further processing of the content) and/or a warning or other message information may be provided to the recipient processor for display to the user. In this manner, the location information may be employed to establish and maintain, in effect, a directed communication link between the provider processor and the recipient processor located at a location corresponding to the location information in the shell or wrapper, or tag or label.

In further embodiments, the shell or wrapper, or tag or label, may include location information corresponding to the location of plural recipient processors, such that the content associated with the shell or wrapper, or tag or label, is communicate in effect, in a directed communication link with plural computers. This directed communication link between the provider processor and the plural recipient processors, thus, comprises a sub-network of the overall wide area network (or Internet). In accordance with such embodiments, the provider processor may communicate directed communications to each recipient processor in a particular sub-network. In addition the provider processor may direct different communications (or different content) to different sub-networks of recipient processors, by appropriately tagging or labeling (or associating shell or wrapper software with) the content communications.

Systems or processes, as described above, in which the recipient processor is provided with a positioning system, for example, but not limited to, a GPS, have a wide variety of applications. Some example applications are described herein. However, it will be understood that the invention encompasses many other applications of systems and processes.

In one example, systems as described above may be employed for communicating content to pre-authorized users or subscribers, for example, in the context of a subscription service for audio or visual entertainment, including, but not limited to, movies, music, video games, electronic books or other software programs or electronic content, over a wide area network, such as the Internet. Thus, in one example, a movie or music distribution company registers users and, as part of the registration process as described above, obtains and verifies the user's geographic location or locations. The user may also be issued a user code as part of the registration process. Thereafter, the user may access a web site operated by the distribution company and order or request a movie or music piece. For example, the web site would include prompts and/or links to allow a user to enter a request or order for content (movies or music) by, for example, clicking on appropriate links, icons or otherwise entering and communicating request or order data. Control of access to the requested content would carried out in accordance with any of the above-described embodiments.

Depending upon the process and system embodiment employed, the user may or may not be prompted (or the user computer may or may not be controlled) to communicate user location information to the content provider, over the network. For example, content distribution may be controlled as described above with respect to FIGS. 5 and 6 and related embodiments, in applications in which communication of the recipient's location over the network is not impractical or otherwise undesirable. Alternatively, or in addition, the user may be prompted (or the user computer may be controlled) to communicate user code information to the content provider, over the network, as described above. Furthermore, the requested content may be encrypted in accordance with the expected user location expected time information and other variables, as described above and communicated to the user over the Internet in encrypted form. In this manner, content distribution may be controlled as described above with respect to FIGS. 7, 8 and 9 and related embodiments.

The content provider may charge subscribing users a fee for allowing access to requested content. Such a fee may allow unlimited access for a period of time (for example a day, month, year, etc.) or may be calculated on a per-use basis (wherein the subscriber is charged for each viewing or playing of the content). The content provider may maintain a record of subscriber charges, for example, associating each subscriber's usage charge with the subscribers identification information and/or user code. In one embodiment, the content provider maintains an account record for pre-paid amounts received by subscribers, for example, in a table in which pre-paid amounts are associated with subscriber information, such as user code. In this manner, as part of the request processing carried out by the content provider, the content provider may determine whether the user making the request has enough funds in the corresponding user account to cover the fees for the requested content. If not, the content provider may communicate a message to the user, indicating that further funds are needed and/or requesting the submission of additional funds. The content provider may deduct fees from a user's account to cover charges described above and may add funds to a user's account to cover refunds, discounts or the like.

In another example embodiment, the content comprises advertisement information associated with a group of one or more stores, restaurants, theaters or other so-called "bricks and mortar" establishments at a particular location or region. As a representative example, a group of establishments may comprise the stores, restaurants and/or theaters or the like, which are all located in a particular shopping area having geographic boundaries, such as a shopping mall, a street or neighborhood of shops, or the like, for example, as shown in FIG. 10.

Figure 10:
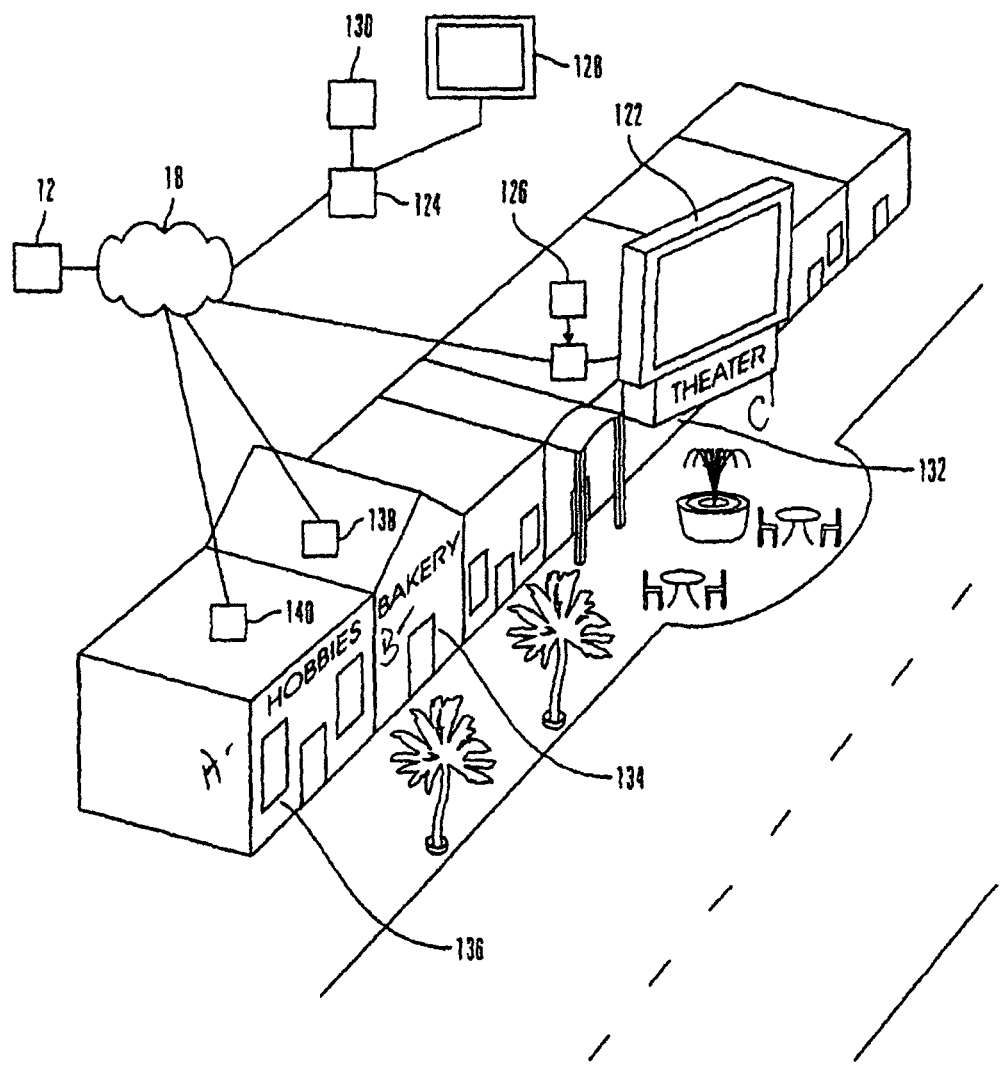
FIG. 10 is a generalized representation of a shopping area which employs a system according to an embodiment of the present invention.
Figure 11:
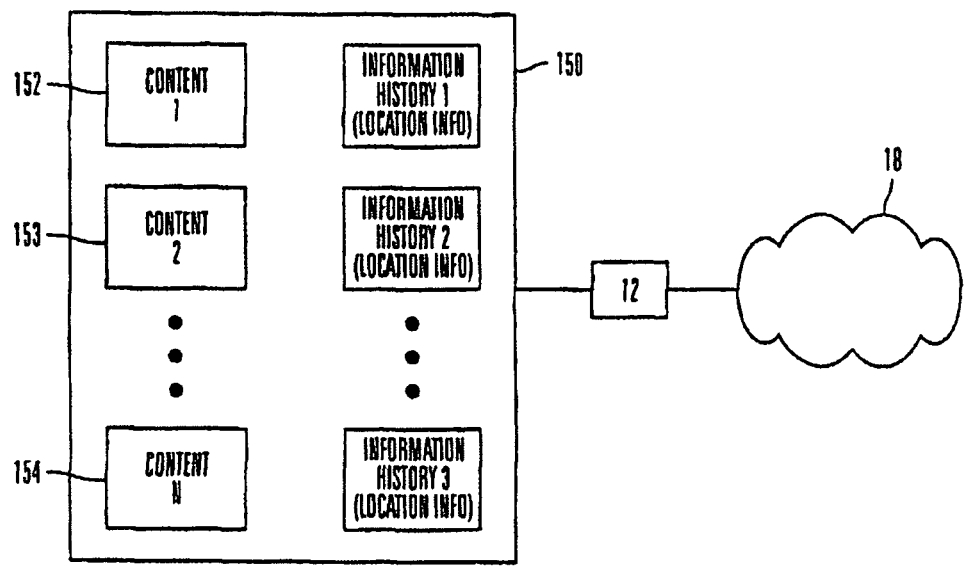
FIG. 11 is a generalized block diagram of a system for associating content and recipient information in a memory.

In one aspect of the FIG. 10 embodiment, the recipient (user) processor comprises a processor 120 coupled to a wide area network (preferably, the Internet) 18 and to a video display device 122. The display device 122 preferably comprises a large format display, such as a large-screen tube, plasma, or LCD display device or other electronic billboard or electronic sign display device, disposed in a location which is readily viewable to people present in the shopping area. In the illustrated example, the display 122 is located above the entrance to a movie theater and comprises or is part of the marquee of the theater. The illustrated example also shows another recipient processor 124, coupled to another display device 128, for example, located at a theater in another shopping area. In other embodiments, the display devices 122 and 126 may be located in other suitable, preferably readily viewable and highly noticeable, locations in their respective shopping areas. In preferred embodiments, each recipient processor is associated with a respective position system, for example, a GPS, as represented by 126 and 130, respectively.

In the FIG. 10 example, each recipient processor 120 and 124 is provided content from the content provider processor 12. In embodiments in which geographic control is not employed, the content may be directed to the recipient processors in any suitable manner, including, but not limited to conventional addressing schemes. However, in preferred embodiments, any one of the above processes or systems for controlling the distribution of content based on geographic location may be employed. Thus, according to such processes and systems, the processor 120 is provided access to (or is able to decrypt) first content provided by the content provider 12, based on the location of the processor 120, as determined by the GPS 126, but is denied access to (or is unable to decrypt) second content provided by the content provider 12. On the other hand, processor 124 is provided access to (or is able to decrypt) the second content, based on the location of the processor 124, as determined by the GPS 130, but is unable to access (or decrypt) the first content. In this manner, the provider processor 12 may provide first content to the recipient processor 120, wherein the first content corresponds to advertisement or promotional information relating to the establishments within the same shopping area as the processor 120. Similarly, the provider processor 12 may provide second content to the recipient processor 124, wherein the second content corresponds to advertisement or promotional information relating to establishments within the same shopping area as processor 124.

In this manner, the display device 122, which is viewable to shoppers or potential shoppers within a first shopping area, will display information, advertisement or promotional material relating to shops, restaurants, theaters or other establishments in the same shopping area. On the other hand, display device 128 will display information relating to the establishments in its respective shopping area. The control of access to the appropriate content for displaying the appropriate information at the respective shopping areas is, therefore, based on the geographic location the respective recipient processors 120 and 124.

In one preferred embodiment, the first content to which the processor 120 is provided access, produces a display on display device 122 corresponding to the title and time of a theater production or showing (or multiple titles and times for multiple productions or showings) scheduled to take place at the theater 132. In further preferred embodiments, the first content also comprises video clips corresponding to portions or samples of theater productions or showings scheduled to take place at the theater 132. In yet further preferred embodiments, the first content comprises a combination of such video clips and title information. Similarly, the second content to which the processor 124 is provided access, comprises title, time and/or video clips associated with theater productions or showings scheduled to take place in the theater associated with display device 128. The content provider 12 may comprise a computer operated by the owner of a plurality of theaters (or by the owner's agent, contractor or service provider), which provides access to content by each theater, based on the geographic location of the theater. In this manner, the marquees for a plurality of theaters may be controlled remotely from a single provider processor 12, where each theater marquee displays information specific to productions or showings scheduled for that particular theater.

In a further embodiment of the FIG. 10 example, the first content provided to the recipient processor 120 for display on the display device 122 comprises information, such as promotional or advertisement information for a plurality of different establishments within the same shopping area. Thus, for example, the first content may include advertisement information for a bakery 134 and further advertisement information for a hobby shop 136 located within the same shopping area as the recipient processor 120 and display device 122. Such advertisement information may be communicated to the content provider 12 and stored in advance.

For example, the owner of each of these establishments may have communicated advertisement information to the provider processor 12, from suitable computers 138 and 140 coupled to the network 18. In such an embodiment, the provider processor operates with an associated memory device on which advertisement or other display content is stored, for communication to the recipient processors for displaying at appropriate times. Alternatively, the content provider may link or connect the recipient processor 120 to the computers 138 and 140 at appropriate times, to allow the recipient processor to obtain the advertisement information directly from the computers 138 and 140.

The provider processor 12 may operate a web site for allowing establishments and other advertisers to register and communicate advertisements, promotional information or other information to be displayed on one or more of the display devices 122 and 128. The operator of the provider processor or display devices may charge fees to advertisers, based one or more factors, including, the length of the advertisement, the time and date of the display of the advertisement, the number of times that advertisement is displayed, the number of display devices on which the advertisement is displayed or the like.

The determination of which establishment's advertisement information should be included in the first content provided to the recipient processor 120 and which information should be included in the second content provided to the second processor 124 may be carried out, based on the geographic location of the advertiser. Thus, for example, the advertisement information provided by the bakery and hobby store owners would be associated with geographic information corresponding to the first shopping area in which the recipient processor 120 is located. The advertisers may provide such information with the advertisement information. For example, the advertiser may communicate this information to the provider processor 12, through a user input device or other means for providing position information as described above, including, but not limited to a GPS device coupled to the advertiser's computer 138 and 140. In this manner, the content provider 12 may control the distribution of advertisement information for a plurality of establishments to a particular recipient processor (or a plurality of particular recipient processors and associated display devices), based on the geographic location of the establishments and the recipient processor. Thus, for example, advertisement information content for a given establishment may be directed to a recipient processor and display device (or a plurality of recipient processor and display devices) closest to the geographic location of the establishment to which the advertisement pertains.

In addition, each advertiser may modify, add or delete advertisement information, for example, from the advertiser's computer 134 and 136, by communicating suitable instructions to the provider processor 12 (or directly to the recipient processor 120). In preferred embodiments, each advertiser may control the general time at which the advertiser's message will be displayed, for example, by communicating instructions to the provider processor 12 (or directly to the recipient processor 120) from the advertiser's computer 138 or 140. Such instructions may be communicated, for example, through a web site as described above. In such an embodiment, an advertiser may access the web site from the advertiser's computer 138 or 140 and select operations, such as deleting, adding or modifying content (advertisements or other information) to be displayed, and selecting times, dates or display device locations for displaying the content. The web site may include suitable menus, icons, user input fields or the like for performing the above operations or making the above selections. The web site may even allow an advertiser to request a piece of content to be displayed immediately (or as soon as possible) on one or more selected display devices. Thus, for example, the owner of the bakery 134 may access the web site and communicate instructions or information for displaying on the display device 122 an advertisement for fresh, hot muffins, just before or as the baker removes the muffins from the oven. In this manner, pedestrians within view of the display device 122 and, thus, near the bakery, will be shown, for example, steaming-hot muffins and other visual stimulation, as well as information about where to find the bakery, at a time at which the muffins will have been freshly removed from the oven.

In yet a further embodiment, the establishment's processor 138 or 140 may be programmed to automatically communicate a signal to the provider processor 12 to cause a specified piece of content to be displayed on one or more selected display devices 122 and 128. The automatic communication of the signal to the provider processor may be controlled by an event sensor, such as a timer (where the event is the expiration of a preset time period), a motion or proximity detector for detecting the presence of people or vehicles in an area (such as the shopping area adjacent and within view of a display device 122 or 128), or other sensor or detector. For example, in the above bakery example, a sensor may be provided on the baker's oven (or other equipment), to sense the completion (or near completion) of a baking process, such that a signal is sent to the provider processor to display an advertisement for the baked product immediately (or as soon as possible). In other embodiments, sensors may be employed to sense other events associated with a product or service offered by an advertising establishment, to control the display of an advertisement for the product or service upon the occurrence of the event. Such events may be associated with the manufacture, production, maturation, inventory or other event or variable associated with a product. In one example embodiment, an establishment's inventory control system (electronic or software operated) may be controlled to cause a signal to be sent to the provider processor for displaying an advertisement for a given product, upon the inventory control system determining that the inventory (or expected inventory) of the given product has exceeded a pre-defined threshold. Alternatively, or in addition, the inventory control system may be controlled to cause a signal to be sent to the provider processor for pulling or stopping an otherwise scheduled display of an advertisement for a given product, upon the inventory control system determining that the inventory (or expected inventory) of the given product as fallen below a predefined threshold.

In yet a further embodiment of the FIG. 10 example, establishments within a particular shopping area may communicate information, such as advertisement or promotional information, to a plurality of portable recipient processors located in the same shopping area, through the provider processor. For example, pedestrians or vehicles within the particular shopping area may have portable communication devices connected for communication over the Internet. Such portable communication devices may include portable telephones, personal communication devices or vehicle-mounted communication devices with Internet communication capabilities, as is well known in the art and as described above. In preferred embodiments, such portable devices also include a locating system, for example, but not limited to, a OPS, for providing location information corresponding to the geographic location of the portable devices.

In accordance with one preferred embodiment, users carrying such portable communication devices within (or suitably near) the first shopping are may access information provided by content provider 12 over the network 18, for example, by accessing a web site operated by content provider 12 over the Internet. Content may then be provided to the user, based on the geographic location of the user's portable communication device, in accordance with any of the above-described processes. For example, in accordance with processes as described above with respect to FIGS. 5 and 6, the user may communicate the user's location information to the provider processor. Alternatively, processes and systems in accordance with FIGS. 7-9 may be used to control access of particular content to users in areas associated with the particular content. The provider processor may then control access to information based on the user's location, such that user's located in the first shopping area are provided with information, such as advertisement, promotional or even video clips of theater productions or showings, associated with the stores, restaurants, theaters or other establishments in the first shopping area.

Thus, similar to the FIG. 10 embodiment, people within the first shopping area (in this case, the users of portable communication devices within the first shopping area) may be provided access to advertisement or promotional information from establishments such as the bakery 134 or hobby store 136 located in the first shopping area. On the other hand, users of portable communications devices outside of the first shopping area would not be provided access to such content. However, if those users where located in a second shopping area, they may be provided with content associated with business establishments located in the second shopping area.

In accordance with another preferred embodiment, the provider processor is programmed to keep track of the number of recipient processors (for example, portable communication devices) that are located in each shopping area and accessing the above-noted web site, based on location information received from user processors in connection with the above-described content control processes. Thus, for example, as user's logged onto the web site communicate location information, the web site operator may maintain a count of users accessing the web site from a given region (or each of a plurality given regions). In this manner, the operator of the web site may charge fees to advertisers (such as the bakery 134 or hobby store 136), where the amount of the fees is based on the number of users located in the shopping area and accessing the web site content for that shopping area over a period of time (such as each day, week or month). Alternatively or in addition, the web site owner may use the collected information regarding the number of users and the times at which the users were present in the shopping area and on the web site, to provide advertisers with reports from which statistical information about user behavior may be derived.

In addition, the provider processor may control the communication of certain content at a particular time, depending upon the number of user's in the area accessing the web site at that particular time. Thus, for example, an advertiser may not want to pay for the display of an ad on the web site, unless a specified minimum number of users are located in the shopping area and are accessing the web site. Accordingly, the provider processor may be controlled to display or otherwise provide access to certain advertisement, promotional or other forms of information on the web site, only upon the provider processor determining that a specified minimum number of recipient processors are located within the defined region and are accessing the web site. In yet further embodiments, the provider processor may be further controlled by a routine which changes that minimum number at different times of the day, days of the week, weeks of the year or other suitable periods. Thus, for example, the minimum number may be greater during expected peak shopping times or during periods in which the advertising fees are higher than other periods.

Thus, embodiments of the present invention can be utilized to optimize advertising for local or near-local merchants or businessmen. Indeed, the ability to present advertising, promotional or informational content to a user that is pertinent to the user's physical location and/or pertinent to events associated with the manufacturing, production or inventory can be beneficial to both the user and the advertiser.

In one embodiment, a user accessing a continuous stream of content, such as viewing a movie, show, television program, video game, radio or other transmission, by conventional means or over the Internet or another wide area network, is introduced to advertising before, during or after such. For example, the primary content program, for example, the movie or video game, is segmented into time frames such that breaks occur in the viewing or playing of the primary program. Commercials or advertisements are introduced during each break between segments. The primary content program provides motivation or enticement for the user to access the web site or other communication channel to receive the primary content with the one or more interleaved breaks. However, unlike current advertising modalities, but in accordance with embodiments of the invention, the selection of the commercial, promotional or informational content to include in the interleaved break(s) may be determined, in whole or part, by the physical location of the user. Such embodiments may employ any of the above-described embodiments for controlling content based on the geographic location of the user (recipient processor), to control the communication of commercial or advertisement content to the user (recipient processor) during the interleaved breaks in the primary content.

In one example, the primary content is selected by the user, for example, employing a web site system and process as described above. In a further example, the primary content is made available and communicated (for example, streamed) from the web site at a pre-defined or scheduled time, for immediate playing (viewing) by any user or recipient device accessing the web site during pre-defined or scheduled the time at which the primary content is communicated (streamed). However, instead of (or in addition to) controlling the user's access to the primary content, this embodiment controls the version or selection of content received by the user (recipient processor) during one or more of the interleaved breaks in the primary content. Thus, users within a first and second shopping areas may each request and/or receive the same primary content, a user in the first shopping area will receive first advertisement, promotional or informational content during one or more interleaved breaks in the primary content, while a user in the second shopping area will receive second advertisement, promotional or informational content during the one or more interleaved breaks in the primary content. The first advertisement, promotional or informational content may pertain to establishments located in the first shopping area, while the second advertisement, promotional or information content pertains to establishments located in the second shopping area.

In example embodiments, the provider processor maintains a listing or inventory of advertisements and the physical locations to which the advertisements are relevant. For instance, an advertisement for a local bakery 134 in a first shopping area may not relevant to a person who resides hundreds of miles away from the actual location of that bakery. In contrast, an advertiser, such as Nabisco or Sarah Lee, which has hundreds of bakery stores or distributors throughout the world could be relevant for any user. In some embodiments, at least some of the inventory (advertisements) are associated with a set of criteria by which the advertisement must be presented. For instance, some governing criteria could include one or more time frames (period of time in a day, days in a week, or the like) for presentation of the particular advertisement, the number of presentations within a particular time frame, the geographical restrictions of presentation, and the like. Additionally, the number of persons viewing a particular content presentation at a particular time in a particularly defined geographic location could be parameters for the choice of the type of advertisement displayed and the cost of providing such advertising exposure.

Thus, for example, employing embodiments of the present invention, a web site operator may provide a web site on a \vide area network, such as the Internet. Users, such as potential shopper's may access the web site over the Internet, using portable communication devices (as described above). While fixed-location computers may also access the web site, additional benefit is available with the use of portable communication devices, in that the web site content will change as the portable communication device is transported from region to region, as described below.

In one embodiment, the web site provides entertainment content as the primary content, such as, but not limited to movies, video clips, video games, music, or the like, or information of interest to users, such as, but not limited to stock or other investment prices, weather information, news, traffic information or the like. One or more interleaved breaks in the primary content are provided for displaying advertisement, promotional or informational content as described above. The entertainment or information of interest content is intended to draw user's to the web site. In some embodiments, the user's may be charged a fee to access the web site, in accordance with well-known processes of obtaining fees from on-line users. However other embodiments may provide free access to users, to entice users to access and stay on the site. In either case, advertisers may be charged fees for displaying advertisements during one or more interleaved breaks in the primary content.

When a user in a first region, such as a first shopping area, accesses the web site through a portable communication device, the advertisements or commercials to which the user is provided during one or more interleaved breaks are associated with the first region, such as advertisement information or links to advertisement information for at least one, and preferably a plurality, of the stores, restaurants, theaters or other establishments located in or near the first region. On the other hand, when the user transports the portable communication device to a second region, such as a second shopping area, and accesses the web site, the primary content remains the same, but the advertisements or commercials to which the user is provided during one or more interleaved breaks are advertisements or commercials associated with the second region (and not the first region), such as advertisement information or links to advertisement information for at least one, and preferably a plurality, of the stores, restaurants, theaters or other establishments located in or near the second region.

While examples described above employ a large display device 122 and 128 located in a shopping area (such as part of a theater marquee or other noticeable location) or portable recipient processor devices carried by users in a shopping area, other embodiments may operate in other suitable geographic regions. Examples of other geographic regions in which a large display device 122 and 128 and/or portable user devices may be employed in accordance with embodiments described herein include, but are not limited to, sports stadiums, concert facilities, amusement parks, shopping malls, individual commercial establishments, educational facilities or campuses, office buildings or business campuses, or the like, where the advertisement, promotional or information content relates to establishments located in or near the facility or campus. In one embodiment, the display devices 122 and 128 comprise the display screens or the like employed to display the primary movie or show being shown at a theater, wherein the movie or show content is communicated to the theater (recipient processor at the theater) employing geographic control, as described above, to associate the content with the respective theater. Thus, content to multiple theaters may be controlled from a provider processor, such that a first content is communicated for display at a first theater based on the location of the first theater and second content is communicated for display at a second theater based on the location of the second theater.

In a further example embodiment, the large electronic display devices 122 and 128, as well as additional electronic display devices, are located adjacent selected roadside or highway locations (such as near the approach to a highway or freeway off-ramp). In such an embodiment, content communicated to the recipient processors associated with the electronic display devices 122 and 128 is controlled, such that content displayed by device 122 is advertisement, promotional or informational material relating to establishments near the roadside or highway location of the display device 122 (such as establishments accessible from an off-ramp following the display device 122), while content displayed by device 128 is advertisement, promotional or informational material relating to establishments near the roadside or highway location of the display device 128 (such as establishments accessible from an off-ramp following the display device 128).

Various approaches described herein of communicating geographic information and/or content (including encrypted or un-encrypted embodiments) and controlling the access to content, dependent upon the geographic location, may be employed in accordance with this embodiment of the invention. For example, content associated with a plurality of regions may be provided to all user's that access the web site, but the content may be encrypted, tagged or provided with shell or wrapper software as described above (for example, with respect to FIGS. 8 and 9 and related embodiments), such that only user's located in a first region will be able to access (decrypt, or otherwise process) the content associated with the first region and not the content associated with another region. On the other hand, a user located in the other region would be able to access (decrypt or otherwise process) content associated with that other region and not the content associated with the first region.

In other embodiments, access may be controlled in accordance with a procedure in which the user communicates its location information to the web site provider, such that the provider may make access determinations (for example as described in accordance with the FIGS. 5 and 6 and related embodiments). For example, to determine which commercial should be presented to the user, the content provider computer (for example, the computer carrying the movie), may receive location information from the user computer, review the advertising inventory, and the criteria by which the commercial must be presented. Based upon the physical location of the user and the criteria of the available commercials in the inventory, the provider computer presents a commercial to the user.

In some embodiments, further restrictions could be placed upon the choice of the presentation of the commercial by the user. For instance, a user may decide that he only desires to view automobile commercials, or restaurant commercials during a particular program. In these instances, the content provider computer would further restrict the choice of advertisements to the user based upon the user's parameters. User preferences may be obtained in advance, stored by the content provider and retrieved for example, by associating preference information with a user code (where the user code may be communicated from the user to the provider computer, for example, according to procedures as described above). Alternatively, user preference information may be entered by the user, upon beginning a communication transaction on the web site and stored by the provider computer during the transaction, for controlling communications between the provider and user during that transaction.

It is to be understood that the provider computer need not provide both the primary program (the entertainment or interesting information content) and the commercials or advertisement content. Indeed, in some embodiments, a programming coordinator computer is used to facilitate the joining of the user with the primary programming and separately provides the advertisements from a separate source, or sources. In this instance, the coordinator serves as a single portal through which the commercials can be selected, thereby reducing the number of primary programming facilities that the advertisers are required to contact for distribution of their advertisements. Similar to the content provider computer, the coordinator maintains an inventory of available advertisements with all relevant criteria for displaying and presenting the advertisements. It is to be understood that not only the user, but the content provider or both could be mobile, for example, in a an automobile, plane, boat, etc. In some preferred embodiments, locally applicable advertisements comprise coupons or similar types of sales incentives. For example, once the location of a site visitor or content consumer is ascertained one or more coupons for use in local businesses could be generated.

As described above, the content provider (or coordinator) may charge fees to advertisers and/or users. In one embodiment, as described above, the fees charged to advertisers is dependent upon the number of users detected by the content provider (or coordinator) that accessed the web site and were located within the particular region of the advertiser (as determined from geographic information communicated from each user to the content provider or coordinator).

Also as described above, the display of an advertiser's advertisement content may be controlled so as to occur only when a suitable number of on-line users are determined to be within the advertiser's area. In one embodiment, the web site operator may provide on-line access to information regarding the number of users within particular geographic areas at particular times or within certain time periods. In this manner, advertiser may access the web site (for example via computer 138 or 140 in FIG. 10) and determine when are appropriate times (or time periods in which) to display the advertiser's advertisement content. In this manner an advertiser can put in a "buy" order when a certain number of consumers are on-line viewing the content in a given location at a given time (or time period). The advertiser may place a standing "buy" order by establishing a minimum threshold, such that, when the threshold number of on-line users in a given location at a given time (or time period) is reached the appropriate advertisement is served up in association with the other content to those persons in the proper location.

Systems or processes examples may be described herein with reference to Internet applications. However, further embodiments employing such systems or processes have a wide variety of useful applications in connection with other communication systems. Consider, for example, satellite communications systems in which an information signal (such as, but not limited to, a television signal) is transmitted from a satellite to a plurality of receiver processors located in multiple geographic regions. According to one embodiment of the present invention, the transmitted information signal will be locked out from (unaccessible to) receiver processors that are in restricted geographic regions or that are not in an acceptable geographic region.

In one preferred embodiment, the information provider comprises a subscription satellite television signal provider and the recipient or receiver processors comprise satellite television receivers located at user (subscriber) locations.

The positioning system (preferably a GPS), as well as the processor and software for performing steps as described above, are located with the user's (or subscriber's) satellite signal receiver or processing electronics. In this manner, the receipt and/or processing (such as, but not limited to, decrypting or decoding) of the television signal may be inhibited or restricted, unless GPS location data corresponds to predefined or expected location.

The provider may program or store the predefined or expected location in the receiver-side processor and associated memory, for example, when the provider issues the receiver equipment to the user (subscriber) or installs the receiver equipment at the user's (subscriber's) location. Alternatively, the provider may include information in the transmitted signal, representing the expected or predefined location of the receiver-side processor. Such predefined or expected location information (whether pre-programmed, pre-stored or received with the transmitted signal) is fed to the receiver-side processor. In addition, actual location information, such as GPS data from the GPS associated with the user (subscriber), is fed to the receiver-side processor, for example, when receiver is activated (or a particular television channel or program is selected by the user) to receive a content signal. If the actual location information matches the predefined or expected location, then access to the information (television signal) is allowed. Alternatively, or in addition, the content signal may be encoded according to an encoding scheme which can be decoded by a decoding scheme that requires proper GPS data as part of the decoding algorithm or as a decoding key or simply to allow access to the decoding algorithm or key.

Also while some of the above embodiments are described as employing the software 26 to operate with the user devices, other embodiments may employ positioning systems 20-22 having processing means capable of processing the software 26-28 and performing the functions described above with respect to the user devices or recipient processors 14-16, such that some or all of the location, time and request generation functions are performed by the systems 20-22. In such embodiments, the provider may issue (lend, lease or sell) and periodically (or otherwise successively) monitor such processing systems to customers (users) and may, thereby better guard against fraudulent use of the equipment.

Distribution Based on Location of Provider

While embodiments described above are primarily concerned with employing user (or recipient) location information to control access to information, other embodiments may employ provider location information to control access to information in a similar manner. In such embodiments, the provider processor 12 is associated with a positioning system (such as a GPS) for providing location information representing the geographic location of the provider. Such information is transmitted over the communications network to the recipient processor(s), for example during a handshaking exchange or in conjunction with the transmission of content information. The recipient processor would, then be controlled, for example, according to processes described above, to determine whether the provider processor location information corresponds to an expected (or pre-defined or pre-stored) location. If not, then the recipient processor may ignore or deny user access to the information. If the provider processor location information does correspond to an expected location, then the recipient process would be controlled to allow processing and/or user access to further information received from the provider. In this manner, provider authentication may be accomplished, using the provider location information (such as GPS data) to verify the authenticity of the provider information.

In other embodiments, the expected location may be established from the initial handshaking process or the like at the beginning of a communication transaction, whereby further communications between the provider processor and the recipient processor during the transaction may be directed, based on the geographic location information to be accessible to the provider and recipient processors located at the locations specified during the handshaking process. In yet further preferred embodiments, the provider and recipient processors each communicate location information to the other (or the expected location of the other is known in advance by each). In this manner, communications in both directions between the recipient processor and the provider processor may be controlled to be directed to the specific recipient and provider processors located in the expected location. Furthermore, plural recipient processors and/or provider processors may communicate with each other in such a directed fashion, so as to form a sub-network or private network defined by processor locations.

In addition to providing processor-location dependent sub-networks, further embodiments of systems or processes in which network communications are controlled, dependent on the location of the provider processor include systems or processes for verifying or identifying the source and/or veracity of the content received from the source. For example, in one embodiment, a positioning system as described above (for example, but not limited to, a GPS) is coupled in close proximity to a content provider processor 12 to supply the processor 12 with location information.

In response to a request for content from a recipient processor, the provider processor 12 is controlled by suitable software to provide such location information (such as GPS information) as part of or in association with the transmission of content to a recipient processor. The location information may be in the form of a tag or label provided with the requested content. Alternatively, the location information may be communicated as separate information with respect to the requested content.

The recipient computer is, then, controlled by suitable software to obtain the location information transmitted from the provider processor and determine from the location information whether to provide, deny or otherwise limit access to the content by the user. Access may be denied or limited by denying certain processing steps necessary for the recipient processor to display the content to the user or by modifying the content in some manner, for example, to censor the content. Alternatively, or in addition, the denial or limiting procedure may involve displaying a warning or other message to the user.

For example, if the geographic location of the provider processor of offensive or otherwise sensitive web sites are known in advance, a recipient processor may be controlled, for example, to deny or limit user access to some or all of the content otherwise available on those web sites, for example, to keep children from accessing such web site content. Also, if content providers are required to tag or label some or all of the content available on their web sites, then tracking of the source of illegal, illegitimate, or other content can be simplified. Thus, one aspect of the invention involves the implementation of a communication standard, in which geographic location information (for example, but not limited to GPS information) corresponding to the location of the source of a communication is included with each communication (for example, at least once in each communication transaction or as part of each data packet) over a network, such as the Internet. Such location information may be used to control access to information as described above, to form directed sub-networks as described above, and/or to verify the authenticity or otherwise identify the source of the communication. The source identification function may be a strong deterrent to unscrupulous network users that may otherwise distribute unauthorized copies of copyrighted materials, pornographic materials, or other content having illegal, immoral, unpopular political or other undesirable qualities. The source identification function would also serve to help deter fraudulent sales, purchase offers, auction bids, by requiring the seller, auctioneer of goods or services, purchaser, auction bidder or the like to include location information with a communication of, for example, a purchase order or offer, or the communication of an offer to sell or auction a product or service.

Thus, in accordance with one embodiment of the present invention, an on-line auction or sales agent service may accept requests from on-line users to place certain goods or services of the user for sale or auction. To protect a subsequent purchaser of such goods or services, the auction or sales agent would also require the on-line user to submit location information, for example, but not limited to, GPS information as described above. Time information may also be provided by the on-line user and used by the auction or sales agent service to verify the authenticity of the location information, as described above. The auction or sales agent service would then be able to store the location information and/or provide such information to a subsequent purchaser, in the event that the seller attempts to defraud the purchaser, for example, by collecting the purchasers money without sending the purchased goods or services or by sending defective or otherwise undesirable goods or services. In a similar manner, the auction or sales agent may obtain and record location information and/or time information received from an on-line purchaser, for example, as part of (or in association with) a communication of a purchase request, offer or bid. Such information may then be used to help identify fraudulent purchasers.

As is readily apparent from the foregoing description, embodiments of the invention relating to the control of distribution of information on a wide area network, dependent on the location of the recipient processor, the location of the provider processor or the location of both the provider and recipient processors, have a wide range of useful applications. In addition to the applications discussed above, other applications include controlling the prohibition or allowance, in whole or in part of professional services to a user based on user location or future anticipated location, including, but not limited to, such services as medical treatment or other medical services (E1V117, psychological counseling, chiropractic services), legal services, accounting services, etc. which require the services of a practitioner that is licensed or otherwise certified by a regional authority.

Other examples include controlling the prohibition or allowance, in whole or in part, of dating, matchmaking, or other social and/or business introductory services to a user, a provider or both based on their respective location(s) or future anticipated location(s), or by authentication of location. For example, transmission of information about someone, such as visual data or data for additional contact, like a physical meeting, might be denied a user until the user's location is verified. Such systems or processes may incorporate a comparison to prior electronic communications component for verification that the person has been consistent and truthful. For example, two persons have been corresponding on an online dating service. One of the persons previously said in E-mail #28 that he was in Seattle. His GPS. coordinates for his computers reveal that no message ever came from Seattle. The woman corresponding may not want to physically meet this person until the discrepancy is explained.

Yet further example embodiments may be employed in systems for controlling the transmission of content, such as sexual material, tobacco or liquor advertising, wagering or gaming data, etc., or services relating thereto ("Adult Content") to a person without requiring any representation of age made by the person because the location is known to be a location where the person could not be unless the person was an adult, e.g., the location corresponds to a bar, a casino, a gentleman's club, an adult book store, etc. Similarly, such systems or processes may prohibit the transmission of content or services based upon the location being a known school, library, church or other place where Adult Content dissemination would be inappropriate because of the potential presence of minors.

Additional examples include the prohibition or allowance of transmission, in whole or in part, of entertainment, such as movie premiers, limited engagement content, concerts, plays, sporting or other events to a user based on location. This would be a local black-out enabling technology. This would also work for election results availability on election day when polls are closed in one part of the country and open in another (only practical if the First Amendment issues could be resolved).

Also, while a number of determinations are described above as being accomplished by comparing a value {product identification, location information, region information, user computer id, user location) to a table or list of such values, other embodiments may employ suitable algorithm-based schemes for rendering the determinations.

Further embodiments may employ additional features, such as means for the provider computer to compare the location information received from the requesting computer with other location information obtained from the user, such as, but not limited to, billing address information associated with credit card numbers provided by the user, pre-stored address information (for example, stored in storage means 13 or available to the server from other on-line sources, not shown) which is expected to correspond to a particular user, or the like. If the location information does not correspond to the address information, access to the requested product or service may be denied or limited.

Other uses of location information transmitted by a user computer over the Internet may include, for example, uses associated with detecting stolen or contraband computers. For example, user computers which operate with satellite-signal positioning systems as described above may be programmed to transmit location information to a predetermined address when connected to the Internet such that, in the event the computer is stolen, the computer's location may be tracked. The location information may also be used to track the location of illegal subscribers of Internet connection services.

Figure 12:
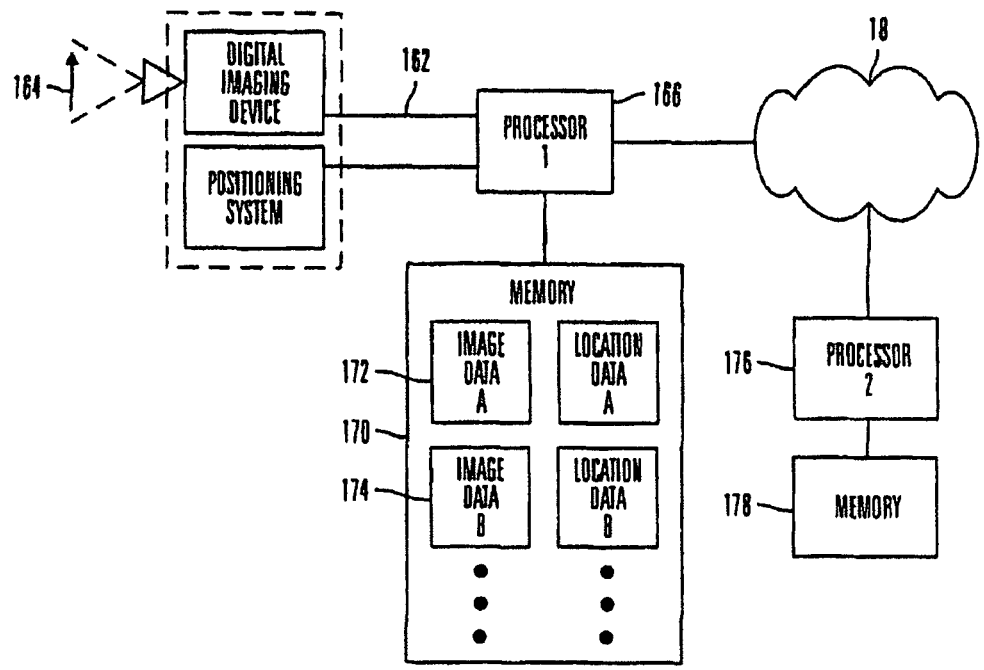
FIG. 12 is a generalized block diagram of a system for associating image information with location information.

A further embodiment of the system and method involving geographic location information obtained from a suitable positioning system as described above (including, but not limited to GPS) relates to correlating or associating image data generated by an imaging device with location information corresponding to the location of the image sensing device. For example, with respect to FIG. 12, an image sensing device 160 (such as a digital camera, video camera, CCD device, CID device or the like) produces a digital signal 162 representative of a sensed image or an object 164.

Digital image data from the device 160 is provided to a processor 166. A positioning system 168 as described above (for example, but not limited to, GPS) within the proximity of the imaging device 160 is also coupled to the processor, to provide location information to the processor.

Under the control of the processor, the positioning system 168 provides location information corresponding to an image recorded by the device 160. For example, the processor may retrieve location information from the positioning system, in response to (or at the time that) the imaging device is operated to record an image. The processor 166 may be controlled to store location information with the associated image information (or otherwise correlated with the associated image information) at a local memory device 170 (such as, but not limited to, a hard, floppy, optical, magneto-optical disc or other suitable storage device).

For example, the image data for an image A may be stored in a file 172 in memory 170. The same file or an associated file may contain location information corresponding to the image A. Similarly, an image B may be stored in a second file 174 in memory 170, with (or in association with another file containing) location data corresponding to image B. In a further embodiment, the processor 166 may be coupled through a network (such as the Internet) to a second processor 176 having an associated memory device 178, such that the processor 166 may communicate image and/or location information to the second processor 176 for storage on the memory device 178.

In the above example, the location information corresponds to the location of the imaging device 160 (by virtue of the positioning system 168 being located in the vicinity of the imaging device 160, preferably within the same housing). In other embodiments, the location information may be more closely correlated to the location of the object 164 being imaged. This may be accomplished by determining the focal point of the imaging device at the time the image is made (for example, by employing position sensing or focus-finding electronics included in the imaging device as part of an automatic focusing system). Alternatively, or in addition, other means for determining the location of the object 164 relative to the device 160 and combining that information with the location of the device 160 as determined by the positioning system 168, may be employed. For example, a user input device may be employed for allowing a user to input a measured or estimated distance between the object 164 and the device 160.

Systems and processes for associating location information with recorded image information may be employed, for example, to make images of crime scene evidence, with electronic recordation of the location of each imaged piece of evidence. Similarly, the system or process may be used for electronic recordation of the location of artifacts by recording image of an archeological site. Images may be made of structures, such as buildings, ships, airships or the like, during manufacture (such as the framework of a building under construction), so as to identify and record the location of beams, pipes, studs or other physical items or structures that will later be sealed within the completed walls of the building, ship or the like. Many other applications of use of such image-location information are also within the scope of the present invention.

Further improvements of the above-described GPS embodiments may include memory devices associated with the GPS device, to store the last-known position of the GPS device. In this manner, if the GPS signal is not obtainable, the GPS device may then retrieve the pre-recorded location information and use that information as location information. Preferably, the recorded GPS information is provided with an expiration time, such that the pre-recorded information may only be used as valid position information for a defined period following acquisition or recording of the information.

The embodiments disclosed herein are to be considered in all respects as illustrative and not restrictive of the invention. The scope of the invention is indicated by the appended claims, rather than the foregoing description. All changes that come within the meaning and range of equivalency of the claims are therefore intended to be embraced therein.

What is claimed is:

1. A method for controlling the distribution of information from an information provider processor to a plurality of recipient processors on a communications network, based on the geographic locations of the recipient processors, the method comprising:

connecting the information provider processor for communication on the communication network with the plurality of recipient processors that each have an associated, respective positioning system for providing location information to the associated recipient processor, the location information corresponding to the geographic location of the associated recipient processor;

providing each recipient processor access over the communication network, by the information provider processor, to first information in encrypted form of the type that can be decrypted using a decryption key that includes or is composed of at least one value, number or parameter that includes location information for one or more of the recipient processors, but not all of the recipient processors, to allow each of said one or more of the recipient processors, but not all of the recipient processors, to use location information provided by its associated positioning system to form a decryption key for decrypting the encrypted first information to a decrypted form; and configuring each respective recipient processor to apply a decryption routine on the encrypted first information using a decryption key that includes or is composed of at least one value, number or parameter that includes location information for the respective recipient processor, to attempt to decrypt the encrypted first information.

2. A method for controlling the distribution of information from an information provider processor to a plurality of recipient processors on a communications network, based on the geographic locations of the recipient processors, the method comprising:

connecting the information provider processor for communication on the communication network with the plurality of recipient processors that each have an associated, respective positioning system for providing location information to the associated recipient processor, the location information corresponding to the geographic location of the associated recipient processor;

providing each recipient processor access over the communication network, by the information provider processor, to first information in encrypted form of the type that can be decrypted using a decryption key that includes or is composed of at least one value, number or parameter that includes location information for one or more of the recipient processors, but not all of the recipient processors, to allow each of said one or more of the recipient processors, but not all of the recipient processors, to use location information provided by its associated positioning system to form a decryption key for decrypting the encrypted first information to a decrypted form; and configuring each respective recipient processor to apply a decryption routine on the encrypted first information using a decryption key that includes or is composed of at least one value, number or parameter that includes a conjunction of current time information and location information for the respective recipient processor, to attempt to decrypt the encrypted first information.

3. A method for controlling the distribution of information from an information provider processor to a plurality of recipient processors on a communications network, based on the geographic locations of the recipient processors, the method comprising:

connecting the information provider processor for communication on the communication network with the plurality of recipient processors that each have an associated, respective positioning system for providing location information to the associated recipient processor, the location information corresponding to the geographic location of the associated recipient processor;

providing each recipient processor access over the communication network, by the information provider processor, to first information in encrypted form of the type that can be decrypted using a decryption key that includes or is composed of at least one value, number or parameter that includes location information for one or more of the recipient processors, but not all of the recipient processors, to allow each of said one or more of the recipient processors, but not all of the recipient processors, to use location information provided by its associated positioning system to form a decryption key for decrypting the encrypted first information to a decrypted form; and configuring each respective recipient processor to apply a decryption routine on the encrypted first information using a decryption key that includes or is composed of at least one value, number or parameter that includes a conjunction of identification information and location information for the respective recipient processor, to attempt to decrypt the encrypted first information.

4. A method for controlling the distribution of information from an information provider processor to a recipient processor on a communications network, based on the geographic location of the recipient processor, the method comprising:

connecting the recipient processor for communication with the provider processor on the communication network;

receiving location information by the recipient processor from a positioning system, the location information corresponding to the current geographic location of the recipient processor;

receiving first information in encrypted form by the recipient processor from the information provider processor, over the communication network;

decrypting the first information using a decryption key that includes or is composed of at least one value, number or parameter that includes location information corresponding to the current geographic location of the recipient processor.

5. A method as recited in claim 4, wherein decrypting comprises creating a decryption key that includes at least one value, number or parameter that includes location information corresponding to the current geographic location of the recipient processor and applying the decryption key in a decryption routine on the first information.

6. A method as recited in claim 4, wherein decrypting comprises configuring the recipient processor to implement a decryption module, the decryption module for receiving the location information corresponding to the current geographic location of the recipient processor and applying that location information as part of the decryption key.

7. A method as recited in claim 4, wherein the encrypted form of the first information can be decrypted using a decryption key that includes or is composed of at least one value, number or parameter that includes location information corresponding to the current geographic location of the recipient processor and current time information.

8. A method as recited in claim 4, wherein the encrypted form of the first information can be decrypted using a decryption key that includes or is composed of at least one value, number or parameter that includes location information corresponding to the current geographic location of the recipient processor and identification information.

9. A method for controlling the distribution of information from an information provider processor to a plurality of recipient processors on a communications network, based on the geographic locations of the recipient processors, the method comprising:

connecting the information provider processor for communication on the communication network with the plurality of recipient processors that each have an associated, respective positioning system for providing location information to the associated recipient processor, the location information corresponding to the geographic location of the associated recipient processor;

encrypting first information in an encrypted form of the type that can be decrypted using a decryption key that includes or is composed of at least one value, number or parameter that includes location information for one or more of the recipient processors, but not all of the recipient processors, to allow each of said one or more of the recipient processors, but not all of the recipient processors, to use location information provided by its associated positioning system to form the decryption key for decrypting the encrypted first information;

providing each recipient processor access over the communication network, by the information provider processor, to the first information in the encrypted form; and configuring each respective recipient processor to apply a decryption routine on the encrypted first information using a decryption key that includes or is composed of at least one value, number or parameter that includes location information for the respective recipient processor, to attempt to decrypt the encrypted first information.

10. A method as recited in claim 9, further comprising:
storing location information corresponding to at least one expected recipient processor location; and
receiving a request for the first information from a recipient processor after storing the location information;
wherein encrypting first information comprises encrypting the first information in an encrypted form of the type that can be decrypted using a decryption key that includes or is composed of at least one value, number or parameter that includes the stored location information corresponding to at least one expected recipient processor location.

11. A method as recited in claim 1, further comprising:
storing location information corresponding to at least one expected recipient processor location; and
receiving a request for the first information from a recipient processor after storing the location information;
providing each recipient processor access comprises providing each recipient processor access to first information in encrypted form of the type that can be decrypted using a decryption key that includes or is composed of at least one value, number or parameter that includes the stored location information corresponding to at least one expected recipient processor location.

* * * * *